(12) United States Patent
Park et al.

(10) Patent No.: US 12,451,168 B2
(45) Date of Patent: Oct. 21, 2025

(54) MEMORY DEVICE AND OPERATING METHOD THEREOF

(71) Applicant: SAMSUNG ELECTRONICS CO., LTD., Suwon-si (KR)

(72) Inventors: Jihyun Park, Suwon-si (KR); Jungyu Lee, Suwon-si (KR); Yumin Kim, Suwon-si (KR); Chiweon Yoon, Suwon-si (KR); Eunchan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 262 days.

(21) Appl. No.: 18/230,951

(22) Filed: Aug. 7, 2023

(65) Prior Publication Data
US 2024/0257843 A1   Aug. 1, 2024

(30) Foreign Application Priority Data
Jan. 26, 2023   (KR) .................. 10-2023-0010238

(51) Int. Cl.
*G11C 7/02* (2006.01)
*G11C 7/10* (2006.01)
*G11C 7/14* (2006.01)

(52) U.S. Cl.
CPC .............. *G11C 7/02* (2013.01); *G11C 7/1057* (2013.01); *G11C 7/14* (2013.01)

(58) Field of Classification Search
CPC ........... G11C 7/02; G11C 7/1057; G11C 7/14; G11C 7/1084; G11C 11/4074; G11C 11/4063; G11C 16/14; G11C 16/10; G11C 5/147; G11C 16/26; G11C 16/30; G11C 16/0483

USPC ...................................................... 365/185.21
See application file for complete search history.

(56) References Cited

U.S. PATENT DOCUMENTS

| 6,823,293 | B2 * | 11/2004 | Chen ................. G01R 31/3004 714/724 |
|---|---|---|---|
| 8,269,537 | B2 | 9/2012 | Bae et al. |
| 10,134,477 | B2 | 11/2018 | Park et al. |
| 10,811,107 | B2 | 10/2020 | Na et al. |
| 11,435,381 | B2 | 9/2022 | Chae |

FOREIGN PATENT DOCUMENTS

| KR | 0132369 B1 | 5/1996 |
|---|---|---|
| KR | 0106069 B1 | 7/1996 |

* cited by examiner

*Primary Examiner* — Huan Hoang
(74) *Attorney, Agent, or Firm* — Sughrue Mion, PLLC

(57) ABSTRACT

The present disclosure provides for memory apparatuses and systems including noise cancellation circuits, and operating methods thereof. In some embodiments, a memory device includes a first pad, a memory cell plane comprising a plurality of memory cells, a page buffer circuit, and a noise cancellation circuit. The page buffer circuit is configured to sense the memory cell plane, and identify, based on the sensing of the memory cell plane, a state stored in a memory cell of the plurality of memory cells, according to a ground voltage. The noise cancellation circuit is configured to receive a first ground voltage from the first pad, determine a reference voltage based on the first ground voltage, generate a second ground voltage that offsets a noise voltage, based on the reference voltage, and output the second ground voltage to the page buffer circuit.

20 Claims, 13 Drawing Sheets

MEMORY DEVICE AND OPERATING METHOD THEREOF

CROSS-REFERENCE TO RELATED APPLICATIONS

This application claims benefit of priority under 35 U.S.C. § 119 to Korean Patent Application No. 10-2023-0010238, filed on Jan. 26, 2023, in the Korean Intellectual Property Office, the disclosure of which is incorporated by reference herein in its entirety.

BACKGROUND

1. Field

The present disclosure relates generally to a memory device, and more particularly, to a memory device and an operating method thereof, which remove a noise voltage.

2. Description of Related Art

Generally, semiconductor devices, semiconductor memory devices, and/or integrated circuits may be supplied with a source voltage (and/or a ground voltage) from outside of the devices. Alternatively or additionally, the related devices may be configured to perform various operations using the supplied source voltage (and/or the ground voltage). For example, a driving circuit configured to perform various functions may be included in integrated circuits and/or devices. Alternatively or additionally, the driving circuit may be supplied with the source voltage (and/or the ground voltage) to perform at least one function. As a result, when noise occurs in the source voltage (and/or the ground voltage), the driving circuit may not operate smoothly, and thus, the integrated circuits and/or devices in which the driving circuit is installed may not operate smoothly as well.

There exists a need for further improvements in memory device, as the need for smooth operations of the memory devices may be constrained by noise occurring in the source voltage (and/or ground voltage). Improvements are presented herein. These improvements may also be applicable to other semiconductor devices.

SUMMARY

The present disclosure provides memory devices and memory systems, including a noise cancellation circuit, that potentially reduces and/or cancels a noise voltage that may be present in a source and/or ground voltage.

According to an aspect of the present disclosure, a memory device is provided. The memory device includes a first pad, a memory cell plane including a plurality of memory cells, a page buffer circuit, and a noise cancellation circuit. The page buffer circuit is configured to sense the memory cell plane, and identify, based on the sensing of the memory cell plane, a state stored in a memory cell of the plurality of memory cells, according to a ground voltage. The noise cancellation circuit is configured to receive a first ground voltage from the first pad, determine a reference voltage based on the first ground voltage, generate a second ground voltage that offsets a noise voltage, based on the reference voltage, and output the second ground voltage to the page buffer circuit.

According to an aspect of the present disclosure, a memory system is provided. The memory system includes a memory device and a memory controller configured to transfer, to the memory device, a command indicating an operation of the memory device. The memory device includes a first pad, a memory cell plane including a plurality of memory cells, a page buffer circuit, and a noise cancellation circuit. The page buffer circuit is configured to sense the memory cell plane, and identify, based on the sensing of the memory cell plane, a state stored in a memory cell of the plurality of memory cells, according to a ground voltage. The noise cancellation circuit is configured to output a second ground voltage that offsets a noise voltage, based on a first ground voltage received from the first pad. The noise cancellation circuit is further configured to determine a reference voltage based on the first ground voltage, generate the second ground voltage that offsets the noise voltage, based on the reference voltage, and output, to the page buffer circuit, the second ground voltage, in response to the command.

According to an aspect of the present disclosure, an operating method of a memory device is provided. The operating method includes determining a reference voltage based on a first ground voltage applied through a ground pad of the memory device. The operating method further includes generating a second ground voltage that offsets a noise voltage, based on the reference voltage. The operating method further includes outputting the second ground voltage to a page buffer circuit of the memory device sensing a memory cell plane of the memory device.

Additional aspects are set forth in part in the description which follows and, in part, may be apparent from the description, and/or may be learned by practice of the presented embodiments

BRIEF DESCRIPTION OF DRAWINGS

The above and other aspects, features, and advantages of certain embodiments of the present disclosure may be more apparent from the following description taken in conjunction with the accompanying drawings, in which.

DETAILED DESCRIPTION

Figure 1:
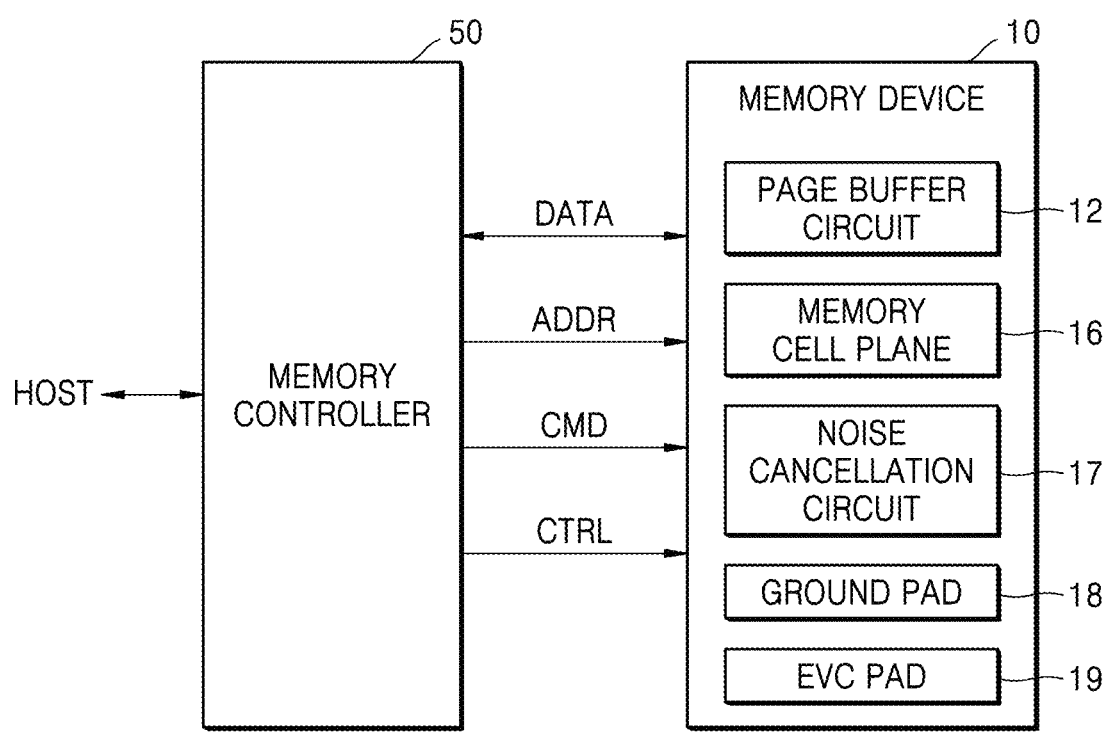
FIG. 1 is a block diagram illustrating a memory system, according to an embodiment.

The following description with reference to the accompanying drawings is provided to assist in a comprehensive understanding of embodiments of the present disclosure, which are example embodiments, defined by the claims and their equivalents. Various specific details are included to assist in understanding, but these details are considered to be exemplary only. Therefore, those of ordinary skill in the art may recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or any possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", etc. may be replaced with terms, such as "first," "second," third" to be used to describe relative positions of elements. The terms "first," "second," third" may be used to described various elements but the elements are not limited by the terms and a "first element" may be referred to as a "second element". Alternatively or additionally, the terms "first", "second", "third", etc. may be used to distinguish components from each other and do not limit the present disclosure. For example, the terms "first", "second", "third", etc. may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

As used herein, each of the terms "SiGe", "GaAs", "InGaAs", "AlGaAs", "SiO", "SiN", and the like may refer to a material made of elements included in each of the terms and is not a chemical formula representing a stoichiometric relationship.

Hereinafter, various embodiments of the present disclosure are described with reference to the accompanying drawings.

FIG. 1 is a block diagram illustrating a memory system 1, according to an embodiment.

Referring to FIG. 1, the memory system 1 may include a memory device 10 and a memory controller 50. The memory device 10 may include a page buffer circuit 12, a memory cell plane 16, a noise cancellation circuit 17, a ground pad 18, and an external voltage contact (EVC) pad 19.

In an embodiment, the memory system 1 may be implemented as an internal memory embedded in an electronic device, such as, but not limited to, an embedded universal flash storage (UFS) memory device, an embedded multimedia card (eMMC), a solid state drive (SSD), and the like. In an optional or additional embodiment, the memory system 1 may be implemented as an external memory which may be detachably attached to an electronic device, such as, but not limited to, a UFS memory card, compact flash (CF) card, a secure digital (SD) card, a micro secure digital (micro-SD) card, a mini secure digital (mini-SD) card, an extreme digital (xD) card, a memory stick, and the like.

In an embodiment, the memory controller 50 may control the memory device 10 based on a command from a host HOST. For example, in response to a write/read request from the host HOST, the memory controller 50 may control the memory device 10 to write data into the memory device 10 and/or read data stored in the memory device 10. That is, the memory controller 50 may provide an address ADDR, a command CMD, and a control signal CTRL to the memory device 10, and thus, may control a write operation, a read operation, and/or an erase operation on the memory device 10. Alternatively or additionally, write data DATA to be written and/or read data DATA may be transferred and/or received between the memory controller 50 and the memory device 10.

The memory device 10 may adjust a reference voltage applied to a plurality of word lines and/or a plurality of bit lines respectively connected with a plurality of memory cells to perform at least one of a write operation, a read operation, and an erase operation on the plurality of memory cells.

The memory cell plane 16 may include a plurality of memory cells. In an embodiment, the memory controller 50 may perform a write operation, a read operation, and/or an erase operation on each memory cell of the plurality of memory cells included in the memory device 10.

The page buffer circuit 12 may operate as a write driver and/or a sense amplifier. For example, the page buffer circuit 12 may sense the memory cell plane 16 in order to identify a state stored in the plurality of memory cells. In an embodiment, in a read operation, the page buffer circuit 12 may operate as the sense amplifier to sense data DATA stored in the memory cell plane 16.

In an embodiment, the page buffer circuit 12 may sense the memory cell plane 16 in order to identify a state stored in a memory cell, based on a ground voltage and an external voltage. For example, the ground voltage may be provided to the ground pad 18 and/or may be provided from the noise cancellation circuit 17. Alternatively or additionally, the external voltage may be provided from the EVC pad 19.

The noise cancellation circuit 17 may potentially reduce and/or substantially cancel a noise voltage included in the ground voltage and/or the external voltage.

In an embodiment, the noise cancellation circuit 17 may generate a second ground voltage by offsetting a noise voltage, based on a first ground voltage, and/or may provide the generated second ground voltage to a peripheral circuit PECT of FIG. 2 as described below. For example, the noise cancellation circuit 17 may provide the page buffer circuit 12 with the noise voltage-offset second ground voltage.

Alternatively or additionally, the noise cancellation circuit 17 may generate a noise voltage-offset external voltage, based on the external voltage, and/or may provide the noise voltage-offset external voltage to the peripheral circuit PECT of FIG. 2 as described below. For example, the noise cancellation circuit 17 may provide the page buffer circuit 12 with the noise voltage-offset external voltage.

In an embodiment, the noise cancellation circuit 17 may generate the noise voltage-offset second ground voltage based on the first ground voltage.

An exemplary method of generating a noise voltage-offset ground voltage by using the noise cancellation circuit 17 is described with reference to FIG. 7.

In an embodiment, the memory device 10 may include a plurality of pads. For example, the memory device 10 may receive power for driving the memory device 10. Alternatively or additionally, the memory device 10 may transfer and/or receive signals through an electrical connection between the memory device 10 and the outside of the memory device 100 by using the plurality of pads.

For example, the ground pad 18 may receive the ground voltage for driving the memory device 10, and/or the memory device 10 may be supplied with the ground voltage through the ground pad 18. Alternatively or additionally, the EVC pad 19 may receive the external voltage for driving the memory device 10, and/or the memory device 10 may be supplied with the external voltage through the EVC pad 19.

Figure 2:
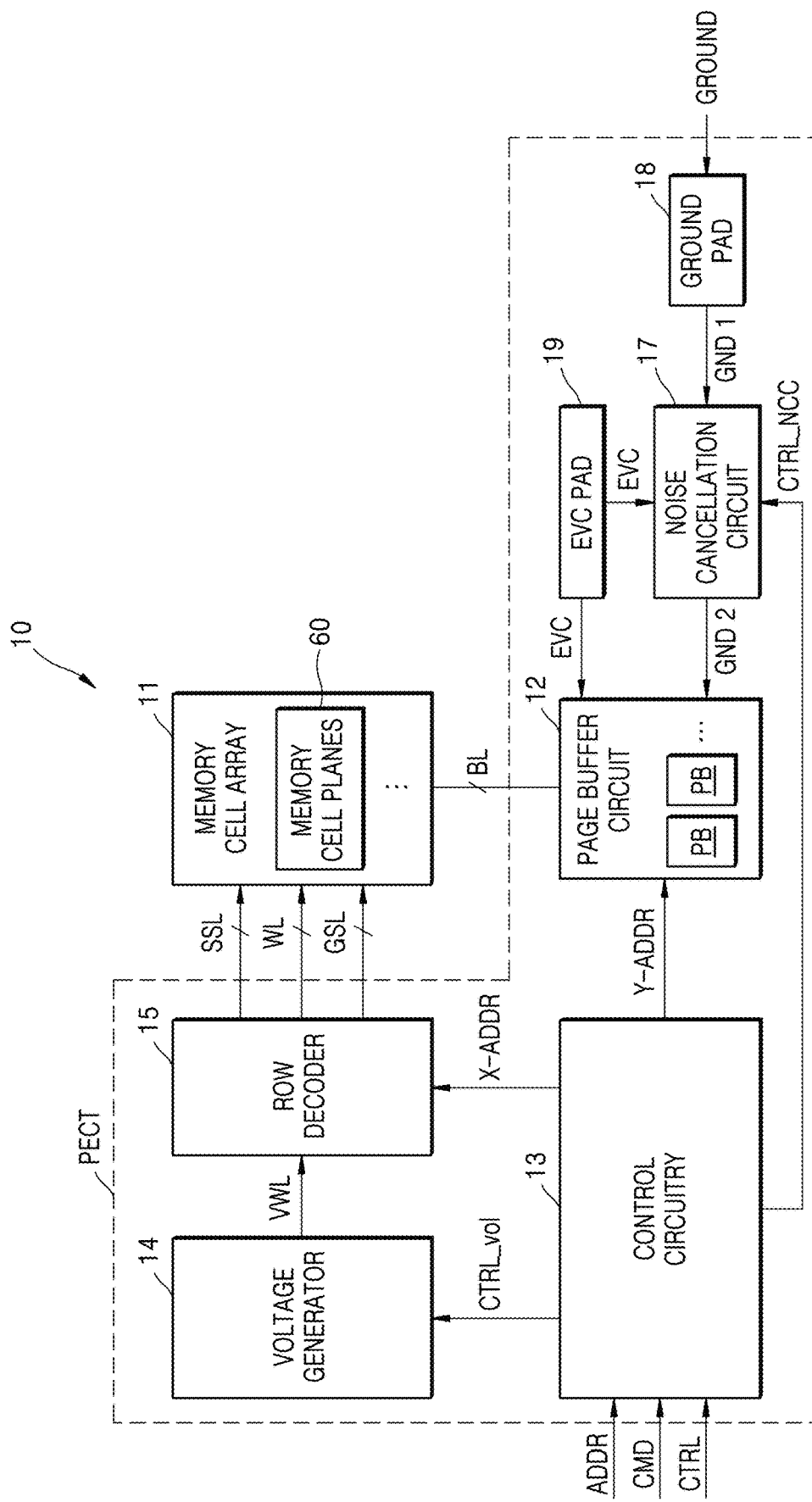
FIG. 2 is a block diagram illustrating a memory device, according to an embodiment.

FIG. 2 is a block diagram illustrating a memory device 10, according to an embodiment.

Referring to FIG. 2, the memory device 10 may include a memory cell array 11 and a peripheral circuit PECT. The memory cell array 11 may include a plurality of memory cell planes 16. The peripheral circuit PECT may include a page buffer circuit 12, a control circuit 13, a voltage generator 14, a row decoder 15, a noise cancellation circuit 17, a ground pad 18, and an EVC pad 19. In an embodiment, the peripheral circuit PECT may further include a data input/output (I/O) circuit and/or an I/O interface.

The ground pad 18 and the EVC pad 19 of FIG. 2 may include or may be similar in many respects to the ground pad 18 and the EVC pad 19 described with reference to FIG. 1, and thus, repeated descriptions thereof are omitted for the sake of brevity.

The memory cell array 11 may be connected (e.g., coupled) with the page buffer circuit 12 through bit lines BL. Alternatively or additionally, the memory cell array 11 may be connected with the row decoder 15 through word lines WL, string selection lines SSL, and ground selection lines GSL.

In an embodiment, the memory cell array 11 may include a plurality of memory cells that may be connected with the word lines WL, the string selection lines SSL, the ground selection lines GSL, and the bit lines BL. In an optional or additional embodiment, the memory cell array 11 may be connected with the row decoder 15 through the word lines WL, the string selection lines SSL, and the ground selection lines GSL. Alternatively or additionally, the memory cell array 11 may be connected with the page buffer circuit 12 through the bit lines BL.

In an embodiment, the plurality of memory cells included in the memory cell array 11 may each be a non-volatile memory cell which may maintain data stored therein even when power supplied thereto is cut off. For example, when the memory cell is a non-volatile memory cell, the memory device 10 may be and/or may include, but not be limited to, electrically erasable programmable read-only memory (EEPROM), flash memory, phase change random access memory (PRAM), resistance random access memory (RRAM), nano-floating gate memory (NFGM), polymer random access memory (PoRAM), magnetic random access memory (MRAM), ferroelectric random access memory (FRAM), and the like. Hereinafter, embodiments are described as an example where the plurality of memory cells are NAND flash memory cells. However, it may be understood that the present disclosure is not limited thereto, and that the embodiments described herein may be applied to other types of memory cells without deviating from the scope of the present disclosure.

In an embodiment, the memory cell array 11 may include a plurality of memory blocks. In such an embodiment, each memory block of the plurality of memory blocks may have a plane structure and/or a three-dimensional (3D) structure. In an optional or additional embodiment, the memory cell array 11 may include at least one of a single level cell block including single level cells (SLCs), a multi-level cell block including multi-level cells (MLCs), a triple level cell block including triple level cells (TLCs), and a quad level cell block including quad level cells (QLCs). For example, some of the plurality of memory blocks may be a SLC block and the other memory blocks may be a MLC block, a TLC block, and/or a QLC block.

Each of the memory cells included in the memory cell array 11 may store data of two or more bits. For example, the memory cell may be an MLC which stores 2-bit data. For another example, the memory cell may be a TLC storing 3-bit data and/or a QLC storing 4-bit data. However, the present disclosure is not limited thereto, and in other embodiments, some memory cells included in the memory cell array 11 may each be an SLC, which stores 1-bit data, and the other memory cells may each be an MLC.

In an embodiment, the memory cell array 11 may include a 3D memory cell array. In such an embodiment, the 3D memory cell array may include a plurality of NAND strings. Each of the NAND strings may include memory cells respectively connected with word lines, which may be vertically stacked on a substrate. However, the present disclosure is not limited thereto, and in other embodiments, the memory cell array 11 may include a two-dimensional (2D) memory cell array.

Alternatively or additionally, the memory cell array 11 may include a plurality of memory cell planes 16. Each memory cell plane of the plurality of memory cell planes may include a plurality of memory blocks. For example, each of the plurality of memory cell planes 16 may include a plurality of memory blocks.

In an embodiment, the memory device 10 may allow each of the memory cell planes 16 to perform different operations by memory cell plane units. That is, the memory cell plane 16 may be and/or may include a set of memory blocks where one operation of the memory device 10 is independently performed. For example, the memory device 10 may simultaneously perform a read operation on a first memory block of a first memory cell plane and a read operation on a second memory block of a second memory cell plane. As used herein, the ability of independently performing memory operations on sets of memory blocks may be referred to as plane independent read (PIR) and/or plane independent core (PIC).

Alternatively or additionally, each of the plurality of memory blocks included in the memory cell array 11 may include at least one page. In an embodiment, each of the pages may include a plurality of memory cells respectively connected with a plurality of word lines WL. In such an embodiment, data may be written in a page unit.

The page buffer circuit 12 may operate in response to control by the control circuit 13. For example, the page buffer circuit 12 may operate as a write driver and/or a sense amplifier. In an embodiment of a program operation, the page buffer circuit 12 may operate as a write driver to apply a voltage to the bit lines BL based on data DATA, which is to be stored in the memory cell array 11, in the bit lines BL. In an embodiment of a read operation, the page buffer circuit 12 may operate as a sense amplifier to sense the data DATA stored in the memory cell array 11.

The page buffer circuit 12 may select some bit lines BL from among the bit lines BL in response to a column address Y-ADDR. That is, the page buffer circuit 12 may operate as the write driver and/or the sense amplifier based on an operation mode.

For example, the page buffer circuit 12 may sense the memory cell plane 16 in order to identify a state stored in the plurality of memory cells. In an embodiment of a read operation, the page buffer circuit 12 may operate as the sense amplifier to sense data DATA stored in the memory cell plane 16.

Alternatively or additionally, the page buffer circuit 12 may sense the memory cell plane 16 in order to identify a state stored in a memory cell, based on a second ground voltage GND 2, which may be generated from a first ground voltage GND 1 and may be provided by the noise cancellation circuit 17 and an external voltage EVC received by the EVC pad 19.

The control circuit 13 may output various internal control signals for programming (e.g., writing) data in the memory cell array 11 and/or reading data from the memory cell array 11, based on a command CMD, an address ADDR, and a control signal CTRL. For example, the control circuit 13 may output a voltage control signal CTRL_vol for controlling levels of various voltages generated by the voltage generator 14.

Alternatively or additionally, the control circuit 13 may transfer a signal CTRL_NCC, indicating an operation of the noise cancellation circuit 17, to the noise cancellation circuit 17. For example, the noise cancellation circuit 17 may operate in an idle state in response to a first signal of the control circuit 13. Alternatively or additionally, the noise cancellation circuit 17 may operate in a busy state in response to a second signal of the control circuit 13. A method of performing an operation of the noise cancellation circuit 17 in an idle state and a busy state is described with reference to FIG. 8.

The control circuit 13 may provide a row address X-ADDR to the row decoder 15 and/or may provide a column address Y-ADDR to the page buffer circuit 12.

The voltage generator 14 may generate various voltages for performing a program operation, a read operation, and/or an erase operation on the memory cell array 11, based on the voltage control signal CTRL_vol. That is, the voltage generator 14 may generate a word line voltage VWL (e.g., a program voltage, a read voltage, a pass voltage, an erase verify voltage, a program verify voltage, and the like). Alternatively or additionally, the voltage generator 14 may further generate a string selection line voltage and a ground selection line voltage.

In response to the row address X-ADDR, the row decoder 15 may select one memory block from among the plurality of memory blocks, select one word line WL from among word lines WL of the selected memory block, and select one string selection line SSL from among a plurality of string selection lines SSL.

The noise cancellation circuit 17 may be configured to reduce and/or substantially cancel a noise voltage included in the ground voltage.

As shown in FIG. 2, the noise cancellation circuit 17 may generate a noise voltage-offset second ground voltage GND 2 based on the first ground voltage GND 1. The noise cancellation circuit 17 may output the second ground voltage GND 2 to the page buffer circuit 12. For example, the first ground voltage GND 1 may be provided from the ground pad 18. Alternatively or additionally, the external voltage EVC may be applied to the noise cancellation circuit 17, and the external voltage EVC may be provided from the EVC pad 19.

In some embodiments, in response to the signal CTRL_NCC indicating an operation of the noise cancellation circuit 17, the noise cancellation circuit 17 may determine a reference voltage based on the first ground voltage GND 1 and may generate the noise voltage-offset second ground voltage GND 2 based on the determined reference voltage.

An example method of generating a noise voltage-offset ground voltage by using the noise cancellation circuit 17 is described in detail with reference to FIG. 7.

Figure 3:
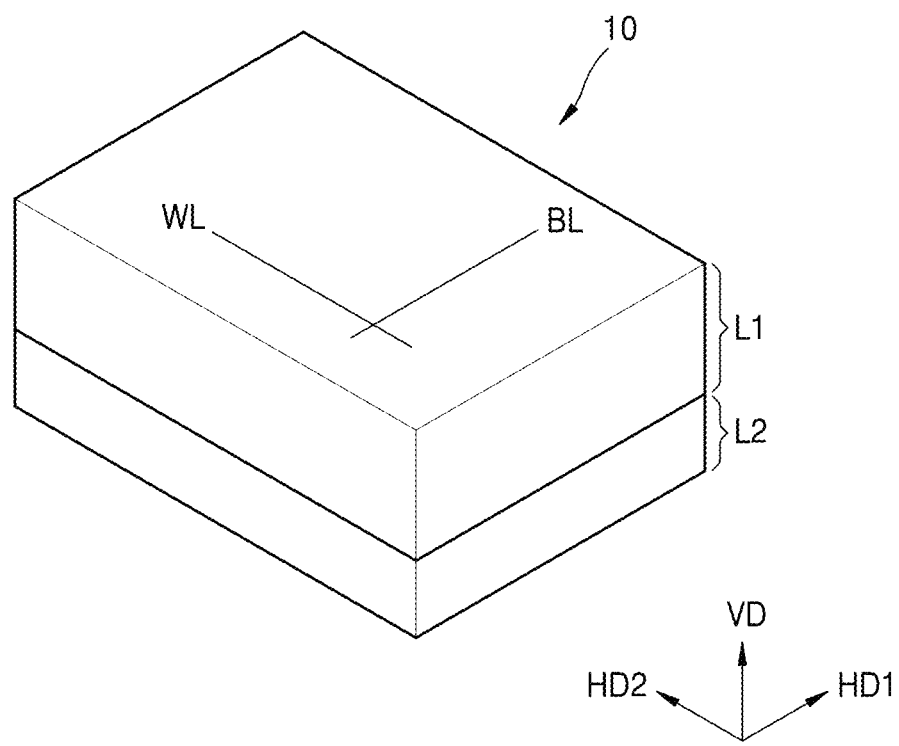
FIG. 3 is a diagram schematically illustrating a structure of the memory device of FIG. 2, according to an embodiment.

FIG. 3 is a diagram schematically illustrating a structure of the memory device 10 of FIG. 2, according to an embodiment.

Referring to FIG. 3, the memory device 10 may include a first semiconductor layer L1 and a second semiconductor layer L2. In an embodiment, the first semiconductor layer L1 may be stacked in a vertical direction VD on the second semiconductor layer L2. That is, the second semiconductor layer L2 may be disposed under the first semiconductor layer L1 in the vertical direction VD, and thus, the second semiconductor layer L2 may be disposed close to a substrate. In an optional or additional embodiment, the memory cell array 11 of FIG. 2 may be provided in the first semiconductor layer L1 and the peripheral circuit PECT of FIG. 2 may be provided in the second semiconductor layer L2. Accordingly, the memory device 10 may have a structure (e.g., a cell over periphery (COP) structure) where the memory cell array 11 is disposed on the peripheral circuit PECT. The COP structure may effectively decrease a horizontal-direction area and may enhance the degree of integration of the memory device 10.

In an embodiment, the second semiconductor layer L2 may include the substrate, and by forming transistors and metal patterns for wiring the transistors on the substrate, the peripheral circuit PECT may be formed in the second semiconductor layer L2. After the peripheral circuit PECT is formed in the second semiconductor layer L2, the first semiconductor layer L1 including the memory cell array 11 may be formed, and the metal patterns for electrically connecting the peripheral circuit PECT, provided in the second semiconductor layer L2, with the word lines WL and the bit lines BL of the memory cell array 11 may be formed. For example, the bit lines BL may extend in a first horizontal direction HD1 and the word lines WL may extend in a second horizontal direction HD2.

In line with advances semiconductor processes, as the number of steps of memory cells provided in the memory cell array may increase (e.g., the number of stacks of word lines WL may increase), an area of the memory cell array 11 may decrease, and thus, an area of the peripheral circuit PECT may be reduced. According to an embodiment, to reduce an area of a region occupied by the page buffer circuit 12, the page buffer circuit 12 may have a structure where a page buffer unit is separated from a cache latch.

Figure 4:
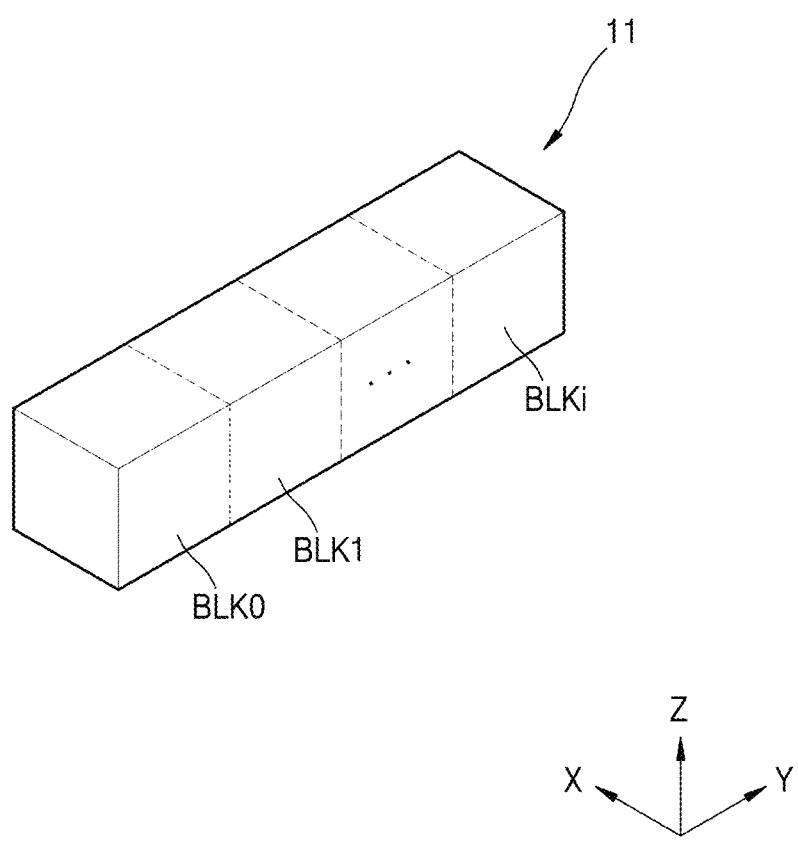
FIG. 4 is a diagram illustrating a memory cell array of FIG. 2, according to an embodiment.

FIG. 4 is a diagram illustrating the memory cell array 11 of FIG. 2, according to an embodiment.

Referring to FIG. 4, the memory cell 11 may include memory blocks BLK0 to BLKi, where i is a positive integer greater than zero (0). In an embodiment, each of the memory blocks BLK0 to BLKi may have a 3D structure (and/or a vertical structure). Alternatively or additionally, each of the memory blocks BLK0 to BLKi may include a plurality of NAND strings extending in a vertical direction VD. The memory blocks BLK0 to BLKi may be selected by a row decoder (e.g., row decoder 15 of FIG. 2).

Figure 5:
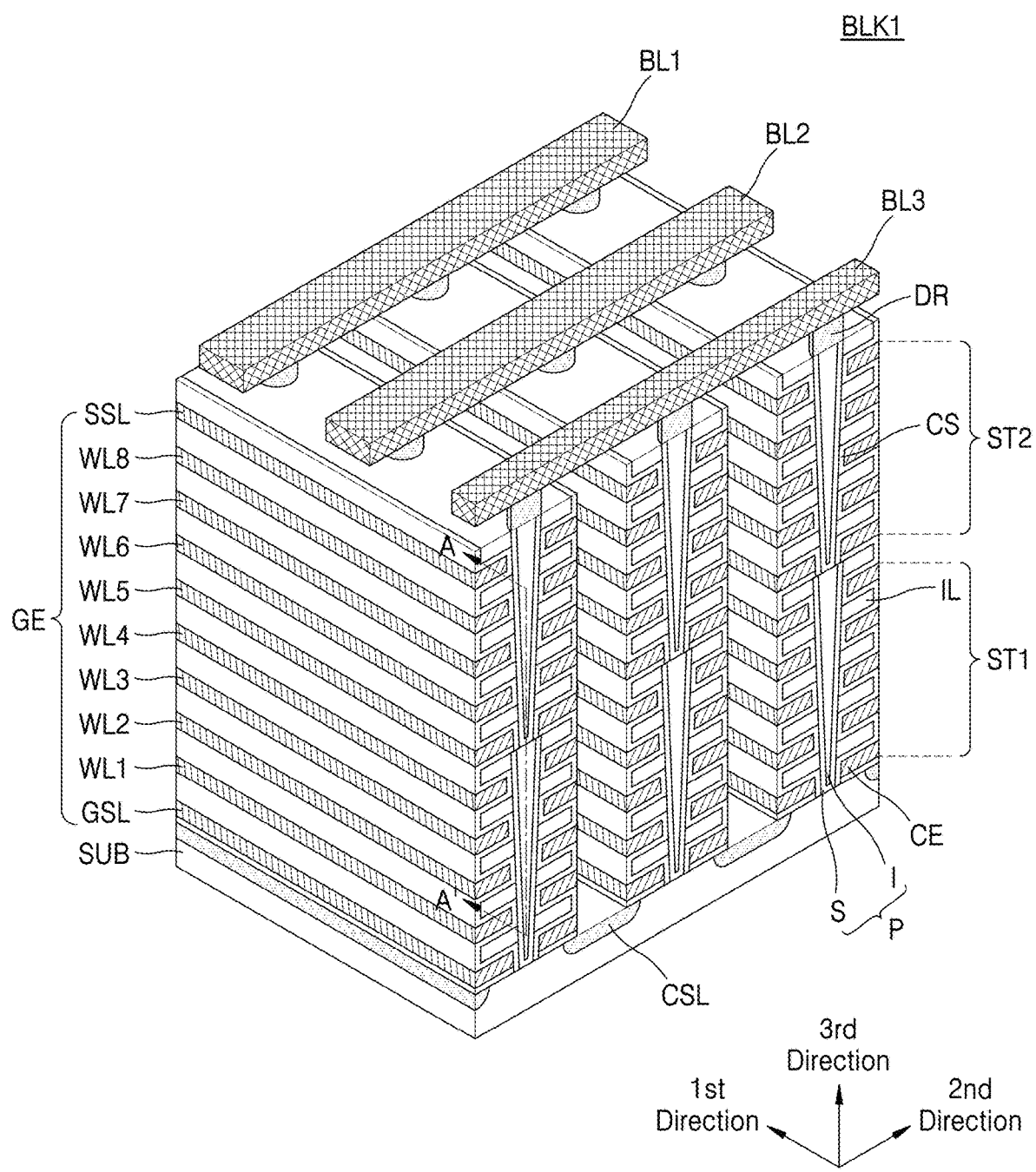
FIG. 5 is a perspective view illustrating a first memory block, according to an embodiment.

FIG. 5 is a perspective view illustrating a first memory block BLK1, according to an embodiment.

Referring to FIG. 5, each memory block included in a memory cell array (e.g., memory cell array 11 of FIG. 2) may be formed in the vertical direction with respect to a substrate SUB. As shown in FIG. 5, the first memory block BLK1 may be formed in a third direction (e.g., 3rd Direction of FIG. 5) on the substrate SUB. Although the first memory block BLK1 is depicted in FIG. 5 as including two selection lines GSL and SSL, eight word lines WL1 to WL8, and three bit lines BL1 to BL3, the present disclosure is not limited thereto. For example, in an embodiment, the first memory block BLK1 may include more or fewer lines.

The substrate SUB may be and/or may include a first conductive type (e.g., p-type). In an embodiment, a common source line CSL, which may extend in a first direction and/or may be doped with impurities of a second conductive type (e.g., n-type), may be provided on the substrate SUB. For example, the substrate SUB may be and/or may include a bulk silicon substrate, a silicon on insulator (SOI) substrate, a germanium substrate, a germanium on insulator (GOI) substrate, a silicon-germanium substrate, and/or an epitaxial thin film substrate obtained by performing selective epitaxial growth (SEG). The substrate SUB may include a semiconductor material, such as, but not be limited to, at least one of silicon (Si), germanium (Ge), silicon germanium (SiGe), gallium arsenide (GaAs), indium gallium arsenide (InGaAs), aluminum gallium arsenide (AlGaAs), and a compound thereof.

A first memory stack ST1 may be provided on the substrate SUB. That is, a plurality of insulation layers IL extending in the first direction may be sequentially provided in the third direction on a region of the substrate SUB between two adjacent common source lines CSL, and the plurality of insulation layers IL may be apart from one another by a certain distance in the third direction. For example, the plurality of insulation layers IL may include an insulating material such as, but not limited to, silicon oxide (SiO). A plurality of pillars P based on etching may be sequentially arranged in the first direction to pass through the plurality of insulation layers IL in the third direction and may be provided on a region of the substrate SUB between two adjacent common source lines CSL. For example, the plurality of pillars P may pass through the plurality of insulation layers IL and may contact the substrate SUB. That is, a surface layer S of each of the pillars P may include a silicon material having a first type and may function as a channel region. Furthermore, an inner layer I of each pillar P may include an air gap and/or an insulating material such as, but not limited to, silicon oxide (SiO).

A charge storage layer CS may be provided along the insulation layers IL, the pillars P, and an exposed surface of the substrate SUB, in a region between two adjacent common source lines CSL. The charge storage layer CS may include a gate insulation layer (and/or a tunneling insulation layer), a charge trap layer, and a blocking insulation layer. For example, the charge storage layer CS may have an oxide-nitride-oxide (ONO) structure. Alternatively or additionally, a gate electrode GE, such as word lines WL1 to WL8 and selection lines GSL and SSL, may be provided on an exposed surface of the charge storage layer CS, in a region between two adjacent common source lines CSL.

In the first memory block BLK1, according to an embodiment, a second memory stack ST2 may be generated by a substantially similar and/or the same method as the method described above and may be additionally provided on the first memory stack ST1 generated by the method described above. Drains and/or drain contacts DR may be respectively provided on a plurality of pillars P extending up to the second memory stack ST2. For example, the drains and/or drain contacts DR may include, but not be limited to, a silicon material doped with impurities having the second conductive type. Bit lines BL1 to BL3, which may extend in a second direction and may be arranged apart from one another by a certain distance in the first direction, may be provided on the drains and/or drain contacts DR.

Figure 6:
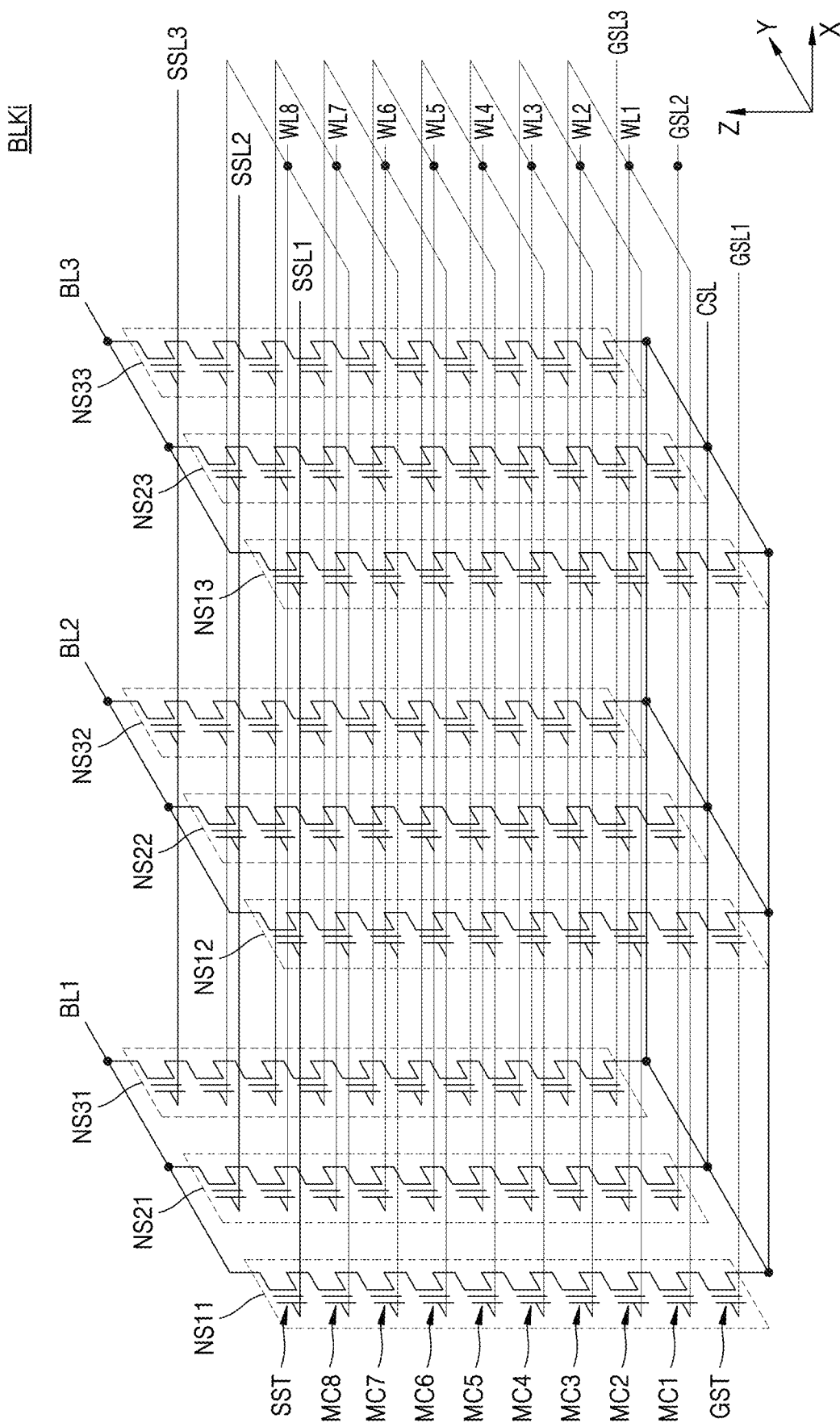
FIG. 6 is an equivalent circuit diagram of a first memory block, according to an embodiment.

FIG. 6 is an equivalent circuit diagram of a first memory block BLK1, according to an embodiment.

Referring to FIG. 6, the first memory block BLK1 may be NAND flash memory having a vertical structure. In an embodiment, each of memory blocks BLK1 to BLKz (where z is a positive integer greater than zero (0)) included in the memory cell array (e.g., memory cell array 11 of FIG. 2) may be implemented as shown in FIG. 6. The first memory block BLK1 may include a plurality of NAND cell strings NS11 to NS33, a plurality of word lines WL1 to WL8, a plurality of bit lines BL1 to BL3, a plurality of ground selection lines GSL1 to GSL3, a plurality of string selection lines SSL1 to SSL3, and a common source line CSL. It is to be understood that the number of NAND cell strings, the number of word lines, the number of bit lines, the number of ground selection lines, and the number of string selection lines may be variously changed according to various embodiments.

In an embodiment, NAND cell strings NS11, NS21, and NS31 may be provided between a first bit line BL1 and the common source line CSL. Alternatively or additionally, NAND cell strings NS12, NS22, and NS32 may be provided between a second bit line BL2 and the common source line CSL. In an optional or additional embodiment, NAND cell strings NS13, NS23, and NS33 may be provided between a third bit line BL3 and the common source line CSL. Each NAND cell string (e.g., NS11) may include a string selection transistor SST, a plurality of memory cells MC1 to MC8, and a ground selection transistor GST, which may be connected with one another in series.

In an embodiment, NAND cell strings connected with one bit line in common may configure one column. For example, the NAND cell strings NS11, NS21, and NS31 connected with the first bit line BL1 in common may correspond to a first column. For another example, the NAND cell strings NS12, NS22, and NS32 connected with the second bit line BL2 in common may correspond to a second column. For another example, the NAND cell strings NS13, NS23, and NS33 connected with the third bit line BL3 in common may correspond to a third column.

In an optional or additional embodiment, NAND cell strings connected with one string selection line may configure one row. For example, the NAND cell strings NS11, NS21, and NS31 connected with a first string selection line SSL1 in common may correspond to a first row. For another example, the NAND cell strings NS12, NS22, and NS32 connected with a second string selection line SSL2 in common may correspond to a second row. For another example, the NAND cell strings NS13, NS23, and NS33 connected with a third string selection line SSL3 in common may correspond to a third row.

The string selection transistor SST, according to an embodiment, may be connected with corresponding string selection lines SSL1 to SSL3. The plurality of memory cells MC1 to MC8 may be respectively connected with corresponding word lines WL1 to WL8. The ground selection transistor GST may be connected with the ground selection lines GSL1 to GSL3, and the string selection transistor SST may be connected with corresponding bit lines BL1 to BL3. The ground selection transistor GST may be connected with the common source line CSL.

In an embodiment, word lines (e.g., WL1) having the same height may be connected with each other in common, the string selection lines SSL1 to SSL3 may be separated from one another, and the ground selection lines GSL1 to GSL3 may be separated from one another. For example, in a case where the NAND cell strings NS11, NS12, and NS13 which are connected with a first word line WL1 and correspond to the first column are programmed, the first word line WL1 and the first string selection line SSL1 may be selected. However, the present disclosure is not limited thereto, and in other embodiments, the ground selection lines GSL1 to GSL3 may be connected with one another in common.

Figure 7:
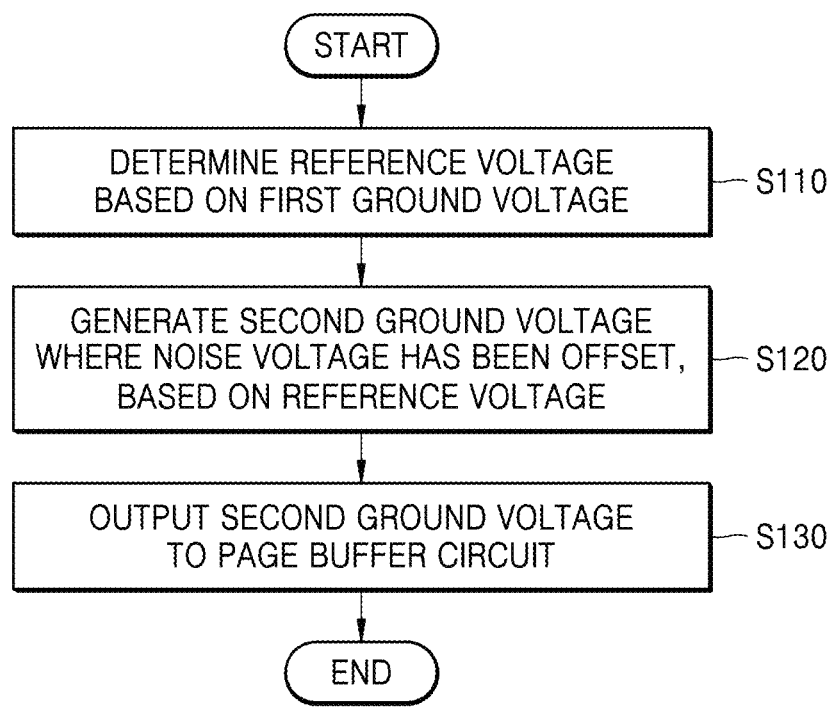
FIG. 7 is a flowchart illustrating an operating method of a memory device, according to an embodiment.

FIG. 7 is a flowchart illustrating an operating method of a memory device 10, according to an embodiment.

Referring to FIGS. 2 and 7, in operation S110, the memory device 10 may determine the reference voltage VREF based on the first ground voltage GND 1 applied through the ground pad 18.

In an embodiment, the noise cancellation circuit 17 may receive the first ground voltage GND 1 from the ground pad 18 and may receive the external voltage EVC from the EVC pad 19. The noise cancellation circuit 17 may determine the reference voltage VREF based on the first ground voltage GND 1.

In an embodiment, the memory device 10 may determine the reference voltage VREF during a first time period in response to a first signal of the control circuit 13. As used herein, the first time period may denote a time period where the noise cancellation circuit 17 included in the memory device 10 operates in an idle state (and/or a sleep state).

In an embodiment, the memory device 10 may determine a voltage, corresponding to a level of the first ground voltage GND 1 of the first time period, as the reference voltage VREF.

In operation S120, the memory device 10 may generate a noise voltage-offset second ground voltage GND 2 based on the determined reference voltage VREF.

In an embodiment, the noise cancellation circuit 17 may generate the noise voltage-offset second ground voltage GND 2 based on the determined reference voltage VREF.

In an embodiment, the memory device 10 may determine the second ground voltage GND 2 during a second time period in response to a second signal of the control circuit 13. As used herein, the second time period may denote a time period where the noise cancellation circuit 17 included in the memory device 10 operates in a busy state (and/or an active state).

In an embodiment, the memory device 10 may generate the second ground voltage GND 2 based on the first ground voltage GND 1 of the second time period and the reference voltage VREF.

In an embodiment, the memory device 10 may perform an input transconductance (GM) calibration operation of a differential comparator based on the first ground voltage GND 1 of the second time period and the reference voltage VREF.

In operation S130, the memory device 10 may output the second ground voltage GND 2 to the page buffer circuit 12.

In an embodiment, the noise cancellation circuit 17 may output the second ground voltage GND 2 to the page buffer circuit 12, which may sense the memory cell plane 16.

An operation of the noise cancellation circuit 17 is described with reference to FIG. 8.

Figure 8:
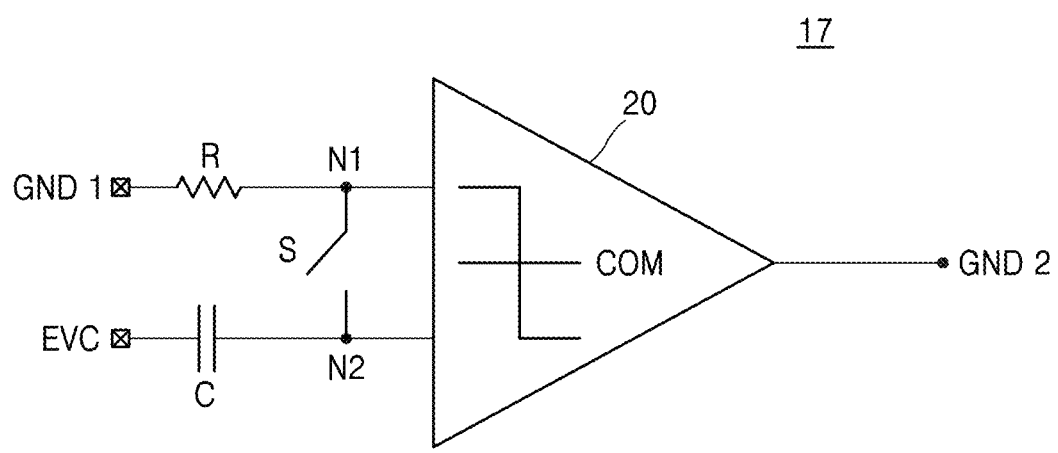
FIG. 8 is a diagram illustrating a noise cancellation circuit, according to an embodiment.

FIG. 8 is a diagram illustrating a noise cancellation circuit 17, according to an embodiment.

Referring to FIG. 8, the noise cancellation circuit 17 may include a resistor R that has a terminal connected (e.g., coupled) with a first node N1 and has another terminal to which a first ground voltage GND 1 is applied. The noise cancellation circuit 17 may further include a capacitor C that has a terminal connected (e.g., coupled) with a second node N2 and has another terminal to which an external voltage EVC is applied. The noise cancellation circuit 17 may further include a switch S connected (e.g., coupled) between the first node N1 and the second node N2. The noise cancellation circuit 17 may further include a comparator 20 that has a first input terminal connected with the first node N1, a second input terminal connected with the second node N2, and an output terminal through which a second ground voltage GND 2 is output.

The control circuit 13 may transfer a signal CTRL_NCC, indicating an operation of the noise cancellation circuit 17, to the noise cancellation circuit 17. For example, the noise cancellation circuit 17 may operate in an idle state and/or a busy state based on the signal CTRL_NCC indicating an operation of the noise cancellation circuit 17.

An operation of the idle state of the noise cancellation circuit 17 is described below.

The noise cancellation circuit 17 may operate in the idle state in response to a first signal of the control circuit 13.

In an operation of the idle state, the noise cancellation circuit 17 may determine a reference voltage VREF based on the first ground voltage GND 1 applied through the ground pad 18 and the external voltage EVC applied through the EVC pad 19.

In an embodiment, the switch S may be turned on and may connect the first node N1 with the second node N2, in response to the first signal of the control circuit 13. In such an embodiment, the first ground voltage GND 1 and the external voltage EVC may each be a direct current (DC) voltage. Thus, when the first node N1 is connected with the second node N2, a level of a voltage applied to the first node N1 and a level of a voltage applied to the second node N2 may correspond to a level of the first ground voltage GND 1.

That is, in an operation of the idle state, the noise cancellation circuit 17 may determine a level of the first ground voltage GND 1 of the idle state as a level of the reference voltage VREF.

For example, when the switch S is turned on, a level of a voltage of the second node N2 may be a level of the first ground voltage GND 1, and the first ground voltage GND 1 may correspond to the reference voltage VREF.

Hereinafter, an operation of the busy state of the noise cancellation circuit 17 is described.

The noise cancellation circuit 17 may operate in the busy state in response to the second signal of the control circuit 13.

In an operation of the busy state, the noise cancellation circuit 17 may generate the second ground voltage GND 2 based on the first ground voltage GND 1 applied through the ground pad 18 and the reference voltage VREF.

In an embodiment, the switch S may be turned off and may disconnect the first node N1 from the second node N2, in response to the first signal of the control circuit 13. In such an embodiment, the external voltage EVC may be a DC voltage. Thus, the capacitor C may correspond to an open node and a level of a voltage applied to the second node N2 may be maintained at a level of the reference voltage VREF (e.g., the first ground voltage GND 1 of the idle state). Furthermore, the first ground voltage GND 1 of the busy state may be applied to a portion including the first input terminal and the resistor R.

That is, when the switch S is turned off, a level of a voltage of the second node N2 may be a level of the reference voltage VREF.

In an embodiment, when the switch S is turned off, the comparator 20 included in the noise cancellation circuit 17 may generate the second ground voltage GND 2 based on the first ground voltage GND 1 and the reference voltage VREF.

In such an embodiment, in an operation of the busy state, the comparator 20 included in the noise cancellation circuit 17 may generate the second ground voltage GND 2 by using, as an input, a level of a voltage except a level of a voltage applied to the resistor R at a level of the first ground voltage GND 1 of the busy state and the reference voltage VREF (e.g., the first ground voltage GND 1 of the idle state).

Hereinafter, various embodiments of the comparator 20 included in the noise cancellation circuit 17 are described with reference to FIGS. 9 and 10.

Figure 9:
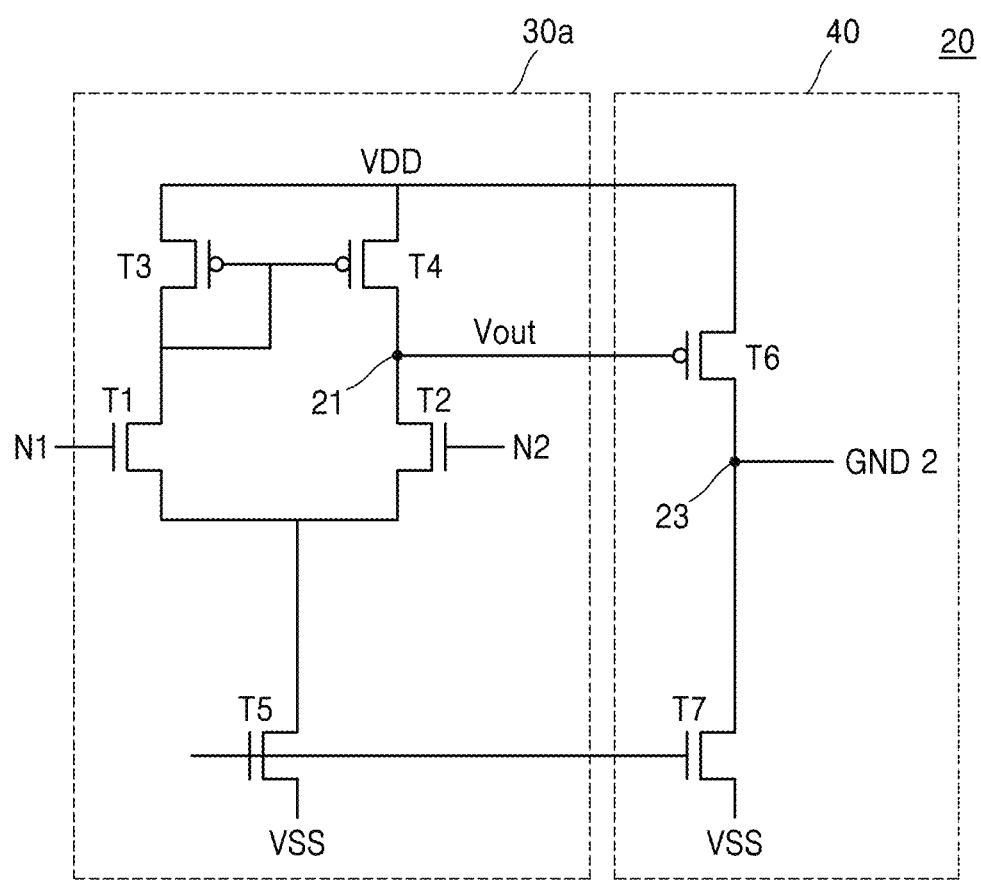
FIG. 9 is a circuit diagram illustrating an equivalent circuit of a comparator, according to an embodiment.

FIG. 9 is a circuit diagram illustrating an equivalent circuit of a comparator 20, according to an embodiment.

The comparator 20 may be implemented as an operational transconductance amplifier (OTA). For example, the comparator 20 may correspond to a differential comparator.

The memory device 10 may generate a second ground voltage GND 2 through the differential comparator, based on a first ground voltage GND 1 and a reference voltage VREF.

Referring to FIG. 9, the comparator 20 may include a comparison signal generator 30a and a ground voltage generator 40.

The comparison signal generator 30a may include a first input transistor T1 which may be connected with a first node N1 to receive the first ground voltage GND 1 and a second input transistor T2 which may be connected with a second node N2 to receive the reference voltage VREF. Alternatively or additionally, the comparison signal generator 30a may include a first output transistor T3 and a second output transistor T4 and may be implemented as a current mirror. However, the present disclosure is not limited thereto, and other structures of the comparator 20 may be used. Notably, the aspects presented herein may be employed with any comparator circuit capable of operating as a differential comparator.

An output voltage Vout (e.g., a comparison signal) may be output from a first output node 21.

The ground voltage generator 40 may include a third output transistor T6 having a gate terminal connected with the first output node 21, and/or the output voltage Vout of the comparison signal generator 30a may be applied to the gate terminal of the third output transistor T6.

The second ground voltage GND 2 may be output from the second output node 23 connected with a source of the third output transistor T6.

That is, the ground voltage generator 40 may generate the second ground voltage GND 2 based on the comparison signal of the comparison signal generator 30a.

Figure 10:
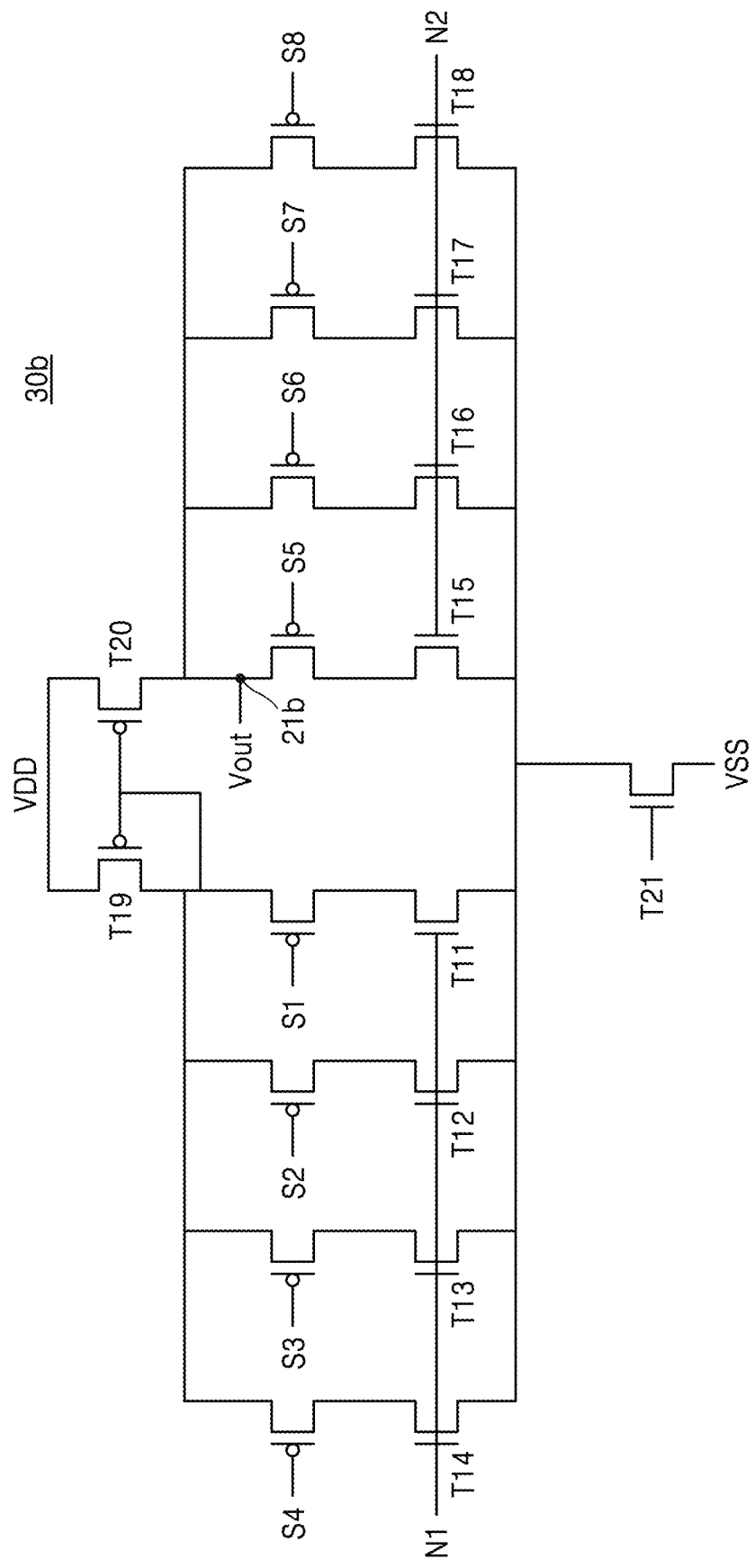
FIG. 10 is a circuit diagram illustrating an equivalent circuit of a comparison signal generator, according to an embodiment.

FIG. 10 is a circuit diagram illustrating an equivalent circuit of a comparison signal generator 30b, according to an embodiment.

The memory device 10 may perform an input transconductance (GM) calibration operation of a differential comparator to generate a second ground voltage GND 2 based on a first ground voltage GND 1 and a reference voltage VREF.

In an embodiment, the comparator 20 may include the comparison signal generator 30b and the ground voltage generator 40 described above with reference to FIG. 9.

Referring to FIG. 10, the comparison signal generator 30b may include first to fourth input transistors (e.g., first input transistor T11, second input transistor T12, third input transistor T13, and fourth input transistor T14), which may be connected with a first node N1 to receive the first ground voltage GND 1, and fifth to eighth input transistors (e.g., fifth input transistor T15, sixth input transistor T6, seventh input transistor T7, and eighth input transistor T18), which may be connected with a second node N2 to receive the reference voltage VREF. Alternatively or additionally, the comparison signal generator 30b may include a first output transistor T19 and a second output transistor T20 and may be implemented as a current mirror. However, the present disclosure is not limited thereto, and other structures comparison signal generator 30b may be used. Notably, the aspects presented herein may be employed with any comparator circuit capable of operating as a differential comparator.

An output voltage Vout (e.g., a comparison signal) may be output from a first output node 21b. As described above with reference to FIG. 9, the ground voltage generator 40 may generate the second ground voltage GND 2 based on the comparison signal of the comparison signal generator 30b.

Furthermore, the comparison signal generator 30b may include first to eighth switches (e.g., first switch S1, second switch S2, third switch S3, fourth switch S4, fifth switch S5, sixth switch S6, seventh switch S7, and eighth switch S8), which may be turned on in response to a signal CTRL_NCC indicating an operation of the noise cancellation signal 17. As shown in FIG. 10, source terminals of the first to eighth switches S1 to S8 may be respectively connected with drain terminals of the first to eighth input transistors T11 to T18. For example, the source terminal of the first switch S1 may be connected with the drain terminal of the first input transistor T11, the source terminal of the second switch S2 may be connected with the drain terminal of the second input transistor T12, the source terminal of the third switch S3 may be connected with the drain terminal of the third input transistor T13, the source terminal of the fourth switch S4 may be connected with the drain terminal of the fourth input transistor T14, the source terminal of the fifth switch S5 may be connected with the drain terminal of the fifth input transistor T15, the source terminal of the sixth switch S6 may be connected with the drain terminal of the sixth input transistor T16, the source terminal of the seventh switch S7 may be connected with the drain terminal of the seventh input transistor T17, and the source terminal of the eighth switch S8 may be connected with the drain terminal of the eighth input transistor T18.

The memory device 10 may turn on and/or turn off the first to eighth switches S1 to S8 and may perform an input transconductance (GM) calibration operation on the first ground voltage GND 1 and the reference voltage VREF.

According to an embodiment, an effect of performing fine trim on a noise voltage may be obtained through the input transconductance calibration operation.

Figure 11:
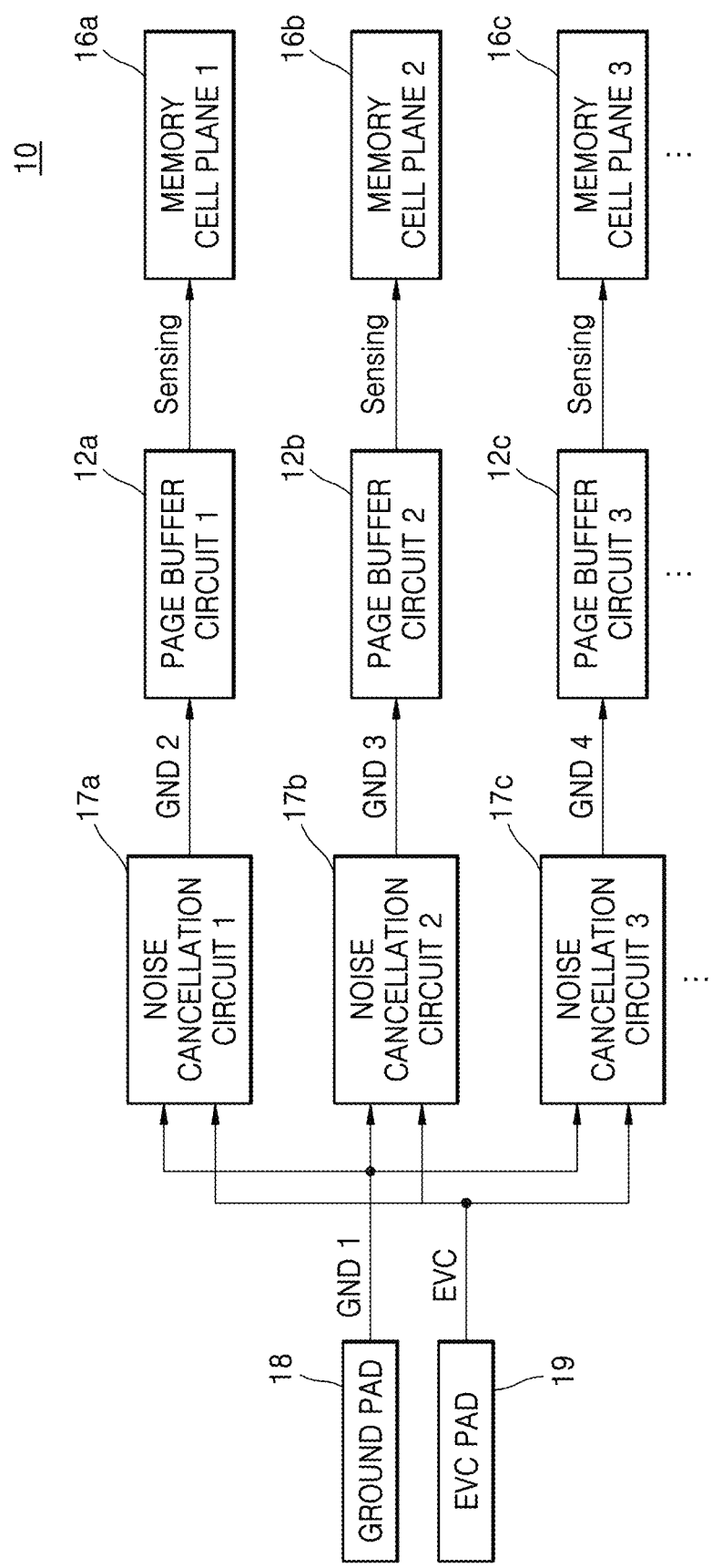
FIG. 11 is a diagram describing an operating method of a memory device, according to an embodiment.

FIG. 11 is a diagram for describing an operating method of a memory device 10, according to an embodiment.

In an embodiment, the number of memory cell planes 16, the number of page buffer circuits 12, and the number of noise cancellation circuits 17 each included in the memory device 10 may each be provided in plurality. Alternatively or additionally, the plurality of page buffer circuits 12 may respectively correspond to the plurality of memory cell planes 60, and the plurality of noise cancellation circuits 17 may respectively correspond to the plurality of memory cell planes 60. For example, each of the plurality of noise cancellation circuits 17 may be configured to output the second ground voltage GND 2 to a page buffer circuit 12, corresponding to a corresponding noise cancellation circuit 17, of the plurality of page buffer circuits 12.

That is, the memory device 10 may include a corresponding noise cancellation circuit 17 for each memory cell plane 16.

Referring to FIG. 11, the memory device 10 may include first to third memory cell planes (e.g., first memory cell plane 16a, second memory cell plane 16b, and third memory cell plane 16c), first to third page buffer circuits (e.g., first page buffer circuit 12a, second page buffer circuit 12b, and third page buffer circuit 12c), first to third noise cancellation circuits (e.g., first noise cancellation circuit 17a, second noise cancellation circuit 17b, and third noise cancellation circuit 17c), a ground pad 18, and an EVC pad 19.

It is to be understood that the number of memory cell planes (e.g., the first to third memory cell planes 16a to 16c), the number of page buffer circuits (e.g., the first to third page buffer circuits 12a to 12c), and the number of noise cancellation circuits (e.g., the first to third noise cancellation circuits 17a to 17c) included in the memory device 10 are depicted for ease of illustration and are not intended to limit the present disclosure. For example, memory device 10 may include a different quantity of these elements without departing from the scope of the present disclosure.

Alternatively or additionally, the first to third page buffer circuits 12a to 12c may respectively correspond to the first to third memory cell planes 16a to 16c, and the first to third noise cancellation circuits 17a to 17c may respectively correspond to the first to third memory cell planes 16a to 16c.

As shown in FIG. 11, each of the first to third noise cancellation circuits 17a to 17c may receive the first ground voltage GND 1 from the ground pad 18 and an external voltage EVC from the EVC pad 19. Alternatively or additionally, the first noise cancellation circuit 17a may determine a reference voltage based on the first ground voltage GND 1, may generate a noise voltage-offset second ground voltage GND 2 based on the reference voltage, and may output the second ground voltage GND 2 to the first page buffer circuit 12a, which may sense the first memory cell plane 16a. Alternatively or additionally, the second noise cancellation circuit 17b may determine a reference voltage based on the first ground voltage GND 1, may generate a noise voltage-offset third ground voltage GND 3 based on the reference voltage, and may output the third ground voltage GND 3 to the second page buffer circuit 12b, which may sense the second memory cell plane 16b. Alternatively or additionally, the third noise cancellation circuit 17c may determine a reference voltage based on the first ground voltage GND 1, may generate a noise voltage-offset fourth ground voltage GND 4 based on the reference voltage, and may output the fourth ground voltage GND 4 to the third page buffer circuit 12c, which may sense the third memory cell plane 16c.

According to an embodiment, since a noise cancellation circuit corresponds to each memory cell plane, a noise voltage included in a ground voltage to a page buffer circuit corresponding to each of a plurality of memory cell planes may be independently offset by memory cell plane units.

Figure 12:
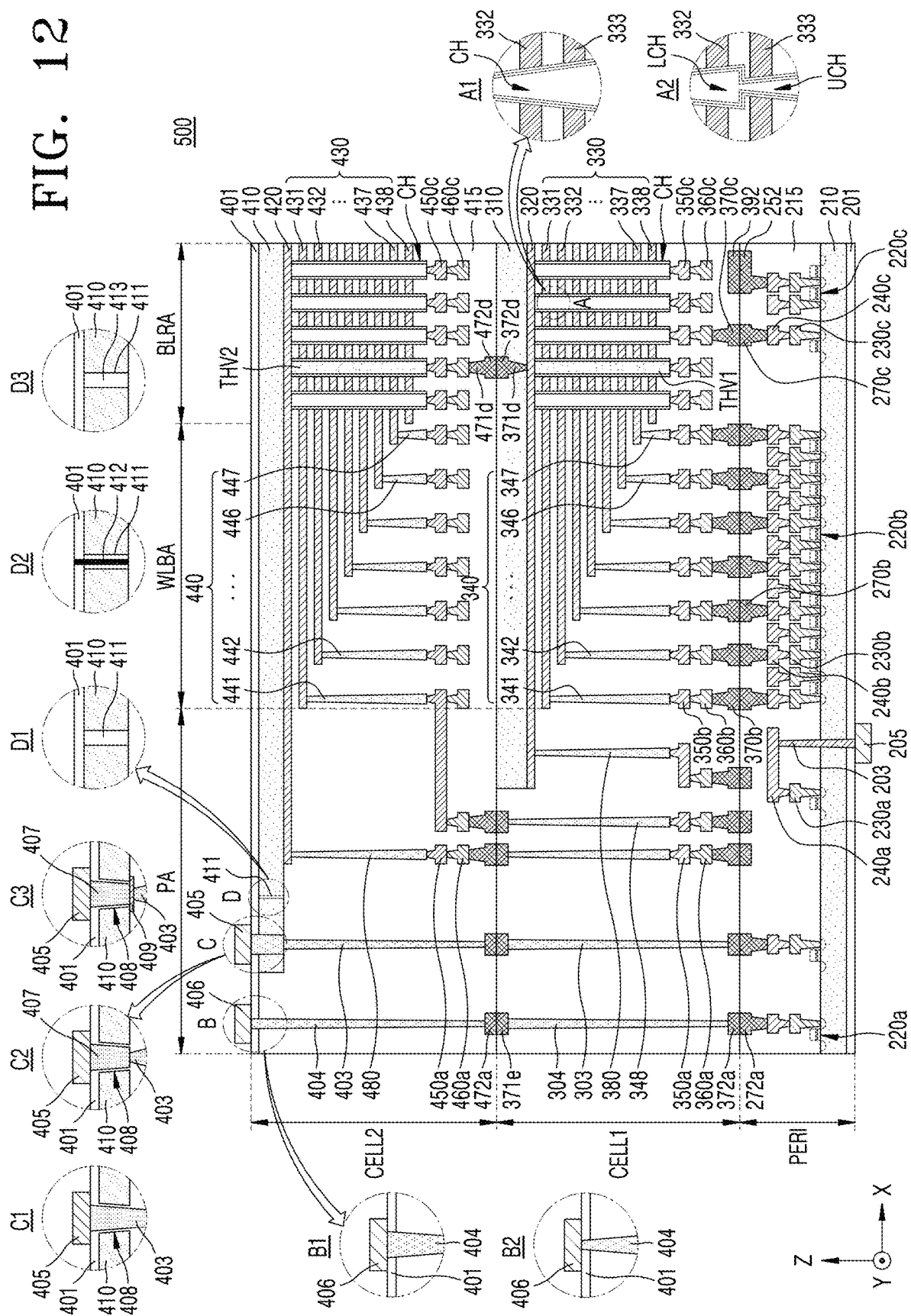
FIG. 12 is a cross-sectional view of a memory device having a bonding vertical NAND (B-VNAND) structure, according to an embodiment.

FIG. 12 is a cross-sectional view of a memory device 500 having a bonding vertical NAND (B-VNAND) structure, according to an embodiment.

Referring to FIG. 12, the memory device 500 may have a chip to chip (C2C) structure. The C2C structure may refer to a structure obtained by connecting at least one upper chip including a cell region (e.g., CELL1, CELL2) and a lower chip including a peripheral circuit region PERI to each other by using a bonding method after separately manufacturing the at least one upper chip including the cell region (e.g., CELL1, CELL2) and the lower chip including the peripheral circuit region PERI. For example, the bonding process may refer to a process of electrically and/or physically connecting a bonding metal pattern, formed in an uppermost metal layer of the upper chip, with a bonding metal pattern formed in an uppermost metal layer of the lower chip. For example, in a case where the bonding metal patterns include copper (Cu), the bonding process may be a Cu—Cu bonding process. Alternatively or additionally the bonding metal patterns may include, but not be limited to, aluminum (Al) and/or tungsten (W). That is, the present disclosure is not limited in this regard.

The memory device 500 may include one or more upper chips each including a cell region. For example, as shown in FIG. 12, the memory device 500 may be implemented to include two upper chips. However, the present disclosure is not limited thereto, and the number of upper chips is not limited thereto. For example, when the memory device 500 is implemented to include two (2) upper chips, a first upper chip including a first cell region CELL1, a second upper chip including a second cell region CELL2, and a lower chip including a peripheral circuit region PERI may each be manufactured, and, the first upper chip, the second upper chip, and the lower chip may be connected with one another by the bonding process.

In an embodiment, the first upper chip may be reversed (e.g., turned over) and connected with the lower chip by the bonding process. Alternatively or additionally, the second upper chip may be reversed and connected with the first upper chip by the bonding process. In the following description, upper portions and lower portions of the first and second upper chips may be referred to based on orientations of the first and second upper chips before the first upper chip and the second upper chip have been reversed. That is, as shown in FIG. 12, an upper portion of the lower chip may refer to an upper portion defined based on a +Z-axis direction, and an upper portion of each of the first and second upper chips may refer to an upper portion defined based on a −Z-axis direction. However, the present disclosure may not be limited in this regard. For example, in some embodiments, only one of the first upper chip and the second upper chip may be reversed and may be connected with each other by the bonding process.

In the memory device 500, each of the peripheral circuit region PERI and the first and second cell regions CELL1 and CELL2 may include an external pad bonding region PA, a word line bonding region WLBA, and a bit line bonding region BLBA.

The peripheral circuit region PERI may include a first substrate 210 and a plurality of circuit devices (e.g., 220a, 220b, and 220c) formed in the first substrate 210. An interlayer insulation layer 215 including one or more insulation layers may be provided on the plurality of circuit devices 220a to 220c. A plurality of metal wirings connecting the plurality of circuit devices 220a to 220c with one another may be provided in the interlayer insulation layer 215. For example, the plurality of metal wirings may include first metal wirings 230a to 230c respectively connected with the plurality of circuit devices 220a to 220c and second metal wirings 240a to 240c respectively formed on the first metal wirings 230a to 230c. The plurality of metal wirings may include at least one of various conductive materials. For example, the first metal wirings 230a to 230c may include a material having a relatively high in electrical resistivity, such as, but not limited to, tungsten (W). Alternatively or additionally, the second metal wirings 240a to 240c may include a material having a relatively low in electrical resistivity, such as, but not limited to, copper (Cu).

Although FIG. 12 depicts first metal wirings 230a to 230c and second metal wirings 240a to 240c, the present disclosure is not limited thereto and one or more additional metal wirings may be further formed on first metal wirings 230a to 230c and/or the second metal wirings 240a to 240c. In such embodiments, the second metal wirings 240a to 240c may include a metal, but not be limited to, aluminum (Al). Alternatively or additionally, at least some additional metal wirings formed on the second metal wirings 240a to 240c may include a material having an electrical resistivity that may be lower than the of aluminum of the second metal wirings 240a to 240c, such as, but not limited to, copper (Cu).

The interlayer insulation layer 215 may be disposed on the first substrate 210 and may include an insulating material such as, but not be limited to, silicon oxide (SiO) and/or silicon nitride (SiN).

Each of the first and second cell regions CELL1 and CELL2 may include at least one memory block. The first cell region CELL1 may include a second substrate 310 and a common source line 320. A plurality of word lines 330 (e.g., 331 to 338) may be stacked on the second substrate 310 in a direction (e.g., a vertical direction Z) perpendicular to an upper surface of the second substrate 310. String selection lines and a ground selection line may be disposed on and/or under the plurality of word lines 330. The plurality of word lines 330 may be disposed between the string selection lines and the ground selection line. In a similar manner, the second cell region CELL2 may include a third substrate 410 and a common source line 420, and a plurality of word lines 430 (e.g., 431 to 438) may be stacked in a direction (e.g., the vertical direction X) perpendicular to an upper surface of the third substrate 410. The second substrate 310 and the third substrate 410 may include various materials, such as, but not limited to, a silicon substrate, a silicon-germanium substrate, a germanium substrate, and/or a substrate including a monocrystalline epitaxial layer grown on a monocrystalline silicon substrate. A plurality of channel structures CH may be formed in each of the first and second cell regions CELL1 and CELL2.

In an embodiment, as shown in a region A1, the channel structure CH may be provided in a bit line bonding region BLBA and moreover, may extend in a direction perpendicular to the upper surface of the second substrate 310 and may pass through the word lines 330, the string selection lines, and the ground selection line. The channel structure CH may include a data storage layer, a channel layer, and a buried insulation layer. The channel layer may be electrically connected with the first metal wiring 350c and the second metal wiring 360c in the bit line bonding region BLBA. For example, the second metal wiring 360c may be a bit line and may be connected with the channel structure CH through the first metal wiring 350c. The bit line 360c may extend in a first direction (e.g., a horizontal direction Y) that may be parallel to the upper surface of the second substrate 310.

In an embodiment, as shown in a region A2, the channel structure CH may include a lower channel LCH and an upper channel UCH, which may be connected with each other. For example, the channel structure CH may be formed by a process performed on the lower channel LCH and a process performed on the upper channel UCH. The lower channel LCH may extend in a direction perpendicular to the upper surface of the second substrate 310 and may pass through the common source line 320 and lower word lines 331 and 332. The lower channel LCH may include a data storage layer, a channel layer, and a buried insulation layer and may be connected with the upper channel UCH. The upper channel UCH may pass through upper word lines 333 to 338. The upper channel UCH may include a data storage layer, a channel layer, and a buried insulation layer, and the channel layer of the upper channel layer UCH may be electrically connected with the first metal wiring 350c and the second metal wiring 360c. As a length of a channel increases, due to characteristics of manufacturing processes, it may be difficult to form a channel having a certain substantially uniform width. The memory device 500, according to an embodiment, may include a channel having width uniformity improved through the lower channel LCH and the upper channel UCH, which may be formed through sequentially performed processes.

As shown in region A2, when the channel structure CH is formed to include the lower channel LCH and the upper channel UCH, a word line disposed near a boundary between the lower channel LCH and the upper channel UCH may be a dummy word line. For example, the word line 332 and the word line 333 each configuring the boundary between the lower channel LCH and the upper channel UCH may be a dummy word line. That is, data may not be stored in memory cells connected with the dummy word line. Alternatively or additionally, the number of pages corresponding to memory cells connected with the dummy word line may be smaller than the number of pages corresponding to memory cells connected with a related word line. A voltage level applied to the dummy word line may differ from a voltage level applied to the related word line. Accordingly, it may be possible to decrease an adverse effect of a non-uniform channel width between the lower channel LCH and the upper channel UCH on an operation of a memory device 500.

In region A2, the number of lower word lines 331 and 332 passing through the lower channel LCH may be less than the number of upper word lines 333 to 338 passing through the upper channel UCH. However, the present disclosure is not limited thereto. For example, the number of lower word lines passing through the lower channel LCH may be formed to be greater than or equal to the number of upper word lines passing through the upper channel UCH. Alternatively or additionally, a structure and a connection relationship of the channel structure CH disposed in the first cell region CELL1 described above may be substantially the same as the channel structure CH disposed in the second cell region CELL2.

In the bit line bonding region BLBA, a first through via THV1 may be provided in the first cell region CELL1 and a second through via THV2 may be provided in the second cell region CELL2. As shown in FIG. 12, the first through via THV1 may pass through the common source line 320 and the plurality of word lines 330. However, the present disclosure is not limited in this regard. For example, the first through via THV1 may further pass through the second substrate 310. In an embodiment, the first through via THV1 may include a conductive material. Alternatively or additionally, the first through via THV1 may include a conductive material surrounded by an insulating material. The second through via THV2 may be provided in a substantially similar shape and/or structure as the first through via THV1.

In an embodiment, the first through via THV1 and the second through via THV2 may be electrically connected with each other through a first through metal pattern 372d and a second through metal pattern 472d. The first through metal pattern 372d may be formed at a lower end of the first upper chip including the first cell region CELL1, and the second through metal pattern 472d may be formed at an upper end of the second upper chip including the second cell region CELL2. The first through via THV1 may be electrically connected with the first metal wiring 350c and the second metal wiring 360c. A lower via 371d may be formed between the first through via THV1 and the first through metal pattern 372d, and an upper via 471d may be formed between the second through via THV2 and the second through metal pattern 472d. The first through metal pattern 372d may be connected with the second through metal pattern 472d by a bonding process.

Alternatively or additionally, in the bit line bonding region BLBA, an upper metal pattern 252 may be formed in an uppermost metal layer of the peripheral circuit region PERI. An upper metal pattern 392 having a substantially similar shape as that of the upper metal pattern 252 may be formed in the uppermost metal layer of the peripheral circuit region PERI. The upper metal pattern 392 of the first cell region CELL1 may be electrically connected with the upper metal pattern 252 of the peripheral circuit region PERI by a bonding process. In the bit line bonding region BLBA, a bit line 360c may be electrically connected with a page buffer included in the peripheral circuit region PERI. For example, some of circuit devices 220c of the peripheral circuit region PERI may provide a page buffer, and the bit line 360c may be electrically connected with the circuit devices 220c, providing the page buffer, through an upper bonding metal 370c of the first cell region CELL1 and an upper bonding metal 270c of the peripheral circuit region PERI.

Continuing to refer to FIG. 12, in a word line bonding region WLBA, the word lines 330 of the first cell region CELL1 may extend in a second direction (e.g., direction X) parallel to the upper surface of the second substrate 310. The word lines 330 may be connected with a plurality of cell contact plugs 340 (e.g., 341 to 347). A first metal wiring 350b and a second metal wiring 360b may be sequentially connected with upper portions of the cell contact plugs 340 connected with the word lines 330. The cell contact plugs 340 may be connected with the peripheral circuit region PERI through the upper bonding metal 370b of the first cell region CELL1 and the upper bonding metal 270b of the peripheral circuit region PERI, in the word line bonding region WLBA.

The cell contact plugs 340 may be electrically connected with a row decoder included in the peripheral circuit region PERI. For example, some of circuit devices 220b of the peripheral circuit region PERI may provide the row decoder, and the cell contact plugs 340 may be electrically connected with the circuit devices 220b, providing the row decoder, through the upper bonding metal 370b of the first cell region CELL1 and the upper bonding metal 270b of the peripheral circuit region PERI. In an embodiment, an operation voltage of each of the circuit devices 220b providing the row decoder may differ from an operation voltage of each of the circuit devices 220c providing the page buffer. For example, the operation voltage of each of the circuit devices 220c providing the page buffer may be greater than the operation voltage of each of the circuit devices 220b providing the row decoder.

In the word line bonding region WLBA, the word lines 430 of the second cell region CELL2 may extend in the second direction (e.g., direction X) parallel to an upper surface of the third substrate 410 and may be connected with a plurality of cell contact plugs 440 (e.g., 441 to 447). The cell contact plugs 440 may be connected with the peripheral circuit region PERI through an upper metal pattern of the second cell region CELL1, a lower metal pattern and an upper metal pattern of the first cell region CELL1, and the cell contact plug 348.

In the word line bonding region WLBA, the upper bonding metal 370b may be formed in the first cell region CELL1. Alternatively or additionally, the upper bonding metal 270b may be formed in the peripheral circuit region PERI. The upper bonding metal 370b of the first cell region CELL1 may be electrically connected with the upper bonding metal 270b of the peripheral circuit region PERI by a bonding process. The upper bonding metal 370b and the upper bonding metal 270b may include a material, such as, but not limited to, aluminum (Al), copper (Cu), tungsten (W), and the like.

In an external pad bonding region PA, a lower metal pattern 371e may be formed in a lower portion of the first cell region CELL1, and an upper metal pattern 472a may be formed in an upper portion of the second cell region CELL2. The lower metal pattern 371e of the first cell region CELL1 and the upper metal pattern 472a of the second cell region CELL2 may be connected with each other in the external pad bonding region PA by a bonding process. Alternatively or additionally, the upper metal pattern 372a may be formed in an upper portion of the first cell region CELL1, and the upper metal pattern 272a may be formed in an upper portion of the peripheral circuit region PERI. The upper metal pattern 372a of the first cell region CELL1 and the upper metal pattern 272a of the second cell region CELL2 may be connected with each other by a bonding process.

Common source line contact plugs 380 and 480 may be disposed in the external pad bonding region PA. The common source line contact plugs 380 and 480 may include a conductive material such as, but not limited to, metal, a metal compound, doped polysilicon, and/or the like. The common source line contact plug 380 of the first cell region CELL1 may be electrically connected with the common source line 320. The common source line contact plug 480 of the second cell region CELL2 may be electrically connected with the common source line 420. A first metal wiring 350a and a second metal wiring 360a may be sequentially stacked on the common source line contact plug 380 of the first cell region CELL1. A first metal wiring 450a and a second metal wiring 460a may be sequentially stacked on the common source line contact plug 480 of the second cell region CELL2.

Input/output (I/O) pads (e.g., first I/O pad 205, second I/O pad 405, and third I/O pad 406) may be disposed in the external pad bonding region PA. Referring to FIG. 12, a lower insulation layer 201 may cover at least a portion of a lower surface of the first substrate 201, and the first I/O pad 205 may be formed on the lower insulation layer 201. The first I/O pad 205 may be connected with at least one of a plurality of circuit devices 220a, disposed in the peripheral circuit region PERI, through the first I/O contact plug 203 and may be isolated from the first substrate 210 by the lower insulation layer 201. Alternatively or additionally, a side insulation layer may be disposed between the first I/O contact plug 203 and the first substrate 210 and may electrically isolate the first I/O contact plug 203 from the first substrate 210.

An upper insulation layer 401 covering an upper surface of the third substrate 410 may be formed on the third substrate 410. A second I/O pad 405 and/or a third I/O pad 406 may be disposed on the upper insulation layer 401. The second I/O pad 405 may be connected with at least one of the plurality of circuit devices 220a, disposed in the peripheral circuit region PERI, through the second I/O contact plugs 403 and 303, and the third I/O pad 406 may be connected with at least one of the plurality of circuit devices 220a, disposed in the peripheral circuit region PERI, through the third I/O contact plugs 404 and 304.

In an embodiment, the third substrate 410 may not be disposed in a region where an I/O contact plug is provided. For example, as shown in region B, the third I/O contact plug 404 may be isolated from the third substrate 410 in a direction parallel to an upper surface of the third substrate 410 and may be connected with the third I/O pad 406 via the interlayer insulation layer 415 of the second cell region CELL2. The third I/O contact plug 404 may be formed by at least one of various processes. That is, the present disclosure is not limited in this regard.

For example, as shown in region B1, the third I/O contact plug 404 may extend in a third direction (e.g., the vertical direction Z) and may be formed as a diameter thereof increases progressively toward the upper insulation layer 401. That is, a diameter of the channel structure CH described with reference to region A1 may be formed to be reduced progressively toward the upper insulation layer 401, but a diameter of the third I/O contact plug 404 may be formed to increase progressively toward the upper insulation layer 401. For example, the third I/O contact plug 404 may be formed after the second cell region CELL2 may be coupled to the first cell region CELL1 by a bonding process.

Alternatively or additionally, as shown in region B2, the third I/O contact plug 404 may extend in the third direction (e.g., the vertical direction Z) and may be formed so that a diameter thereof decreases progressively toward the upper insulation layer 401. That is, like the channel structure CH, a diameter of the third I/O contact plug 404 may be formed to be reduced progressively toward the upper insulation layer 401. For example, the third I/O contact plug 404 may be formed along with the cell contact plugs 440 before the second cell region CELL2 is bonding-coupled to the first cell region CELL1.

In other embodiments, an I/O contact plug may be disposed to overlap the third substrate 410. For example, as shown in region C, the second I/O contact plug 403 may be formed to pass through the interlayer insulation layer 415 of the second cell region CELL2 in the third direction (e.g., the vertical direction Z) and may be electrically connected with the second I/O pad 405 through the third substrate 410. In such an embodiment, a connection structure between the second I/O contact plug 403 and the second I/O pad 405 may be implemented as various types. That is, the present disclosure is not limited in this regard.

For example, as shown in region C1, an opening portion 408 passing through the third substrate 410 may be formed, and the second I/O contact plug 403 may be directly connected with the second I/O pad 405 through the opening portion 408 formed in the third substrate 410. In this case, as shown in region C1, a diameter of the second I/O contact plug 403 may be formed to increase progressively toward the second I/O pad 405. In such an embodiment, a diameter of the second I/O contact plug 403 may be formed to decrease progressively toward the second I/O pad 405. However, the present disclosure is not limited in this regard.

For example, as shown in region C2, the opening portion 408 passing through the third substrate 410 may be formed, and a contact 407 may be formed in the opening portion 408. One end portion of the contact 407 may be connected with the second I/O pad 405, and the other end portion may be connected with the second I/O contact plug 403. Accordingly, the second I/O contact plug 403 may be electrically connected with the second I/O pad 405 through the contact 407 of the opening portion 408. In this case, as shown in region C2, a diameter of the contact 407 may be formed to increase progressively toward the second I/O pad 405, and a diameter of the second I/O contact plug 403 may be formed to increase progressively toward the second I/O pad 405. For example, the third I/O contact plug 404 may be formed along with the cell contact plugs 440 before the second cell region CELL2 is bonding-coupled to the first cell region CELL1, and the contact 407 may be formed after the second cell region CELL2 is bonding-coupled to the first cell region CELL1.

Alternatively or additionally, for example, as shown in region C3, unlike region C2, a stopper 409 may be further formed on an upper surface of the opening portion 408 of the third substrate 410. The stopper 409 may be a metal wiring which is formed on the same layer as the common source line 420. However, the present disclosure is not limited in this regard. For example, the stopper 409 may be a metal wiring which may be formed on the same layer as at least one of the word lines 430. The second I/O contact plug 403 may be electrically connected with the second I/O pad 405 through the contact 407 of the stopper 409.

Similarly to the second and third I/O contact plugs 403 and 404 of the second cell region CELL2, each of the second and third I/O contact plugs 303 and 304 of the first cell region CELL1 may be formed to have a diameter which decreases progressively toward the lower metal pattern 371e, and/or may be formed to have a diameter which increases progressively toward the lower metal pattern 371e.

According to some embodiments, a slit 411 may be formed in the third substrate 410. For example, the slit 411 may be formed at an arbitrary position of the external pad bonding region PA. For example, as shown in regions D1, D2, and D3, when seen from a plane, the slit 411 may be disposed between the second I/O pad 405 and the cell contact plugs 440. However, the present disclosure is not limited in this regard. For example, when seen from a plane, the slit 411 may be formed so that the second I/O pad 405 may be disposed between the slit 411 and the cell contact plugs 440.

For example, as shown in region D1, the slit 411 may be formed to pass through the third substrate 410. The slit 411, for example, may be used to prevent the third substrate 410 from being finely cracked in forming the opening portion 408. However, the present disclosure is not limited in this regard. For example, the slit 411 may be formed to have a depth of about 60% to about 70% of a thickness of the third substrate 410.

Alternatively or additionally, as shown in region D2, a conductive material 412 may be formed in the slit 411. The conductive material 412, for example, may be used for discharging a leakage current, occurring in driving of circuit devices of the external pad bonding region PA, to the outside of the memory device 500. That is, the conductive material 412 may be connected with an external ground line.

In an optional or additional embodiment, as shown in region D3, an insulating material 413 may be formed in the slit 411. The insulating material 413 may, for example, be formed for electrically disconnecting the word line bonding region WLBA from the second I/O pad 405 and the second I/O contact plug 403 disposed in the external pad bonding region PA. When the insulating material 413 is formed in the slit 411, a voltage provided through the second I/O pad 405 may be prevented from affecting a metal layer disposed on the third substrate 410 of the word line bonding region WLBA.

According to some embodiments, the first to third I/O pads 205, 405, and 406 may be selectively formed. For example, the memory device 500 may be implemented to include only the first I/O pad 205 disposed on the first substrate 201, include only the second I/O pad 405 disposed on the third substrate 410, and/or include only the third I/O pad 406 disposed on the upper insulation layer 401.

According to some optional or additional embodiments, at least one of the second substrate 310 of the first cell region CELL1 and the third substrate 410 of the second cell region CELL2 may be used as a sacrificial substrate, and all or only a portion thereof may be removed before and/or after a bonding process. After a substrate is removed, an additional layer may be stacked. For example, the second substrate 310 of the first cell region CELL1 may be removed before and/or after bonding between the peripheral circuit region PERI and the first cell region CELL1, and a conductive layer for connections and/or an insulation layer covering an upper surface of the common source line 320 may be formed. For example, the third substrate 410 of the second cell region CELL2 may be removed before and/or after bonding between the first cell region CELL1 and the second cell region CELL2, and a conductive layer for connections or the upper insulation layer 401 covering an upper surface of the common source line 420 may be formed.

Figure 13:
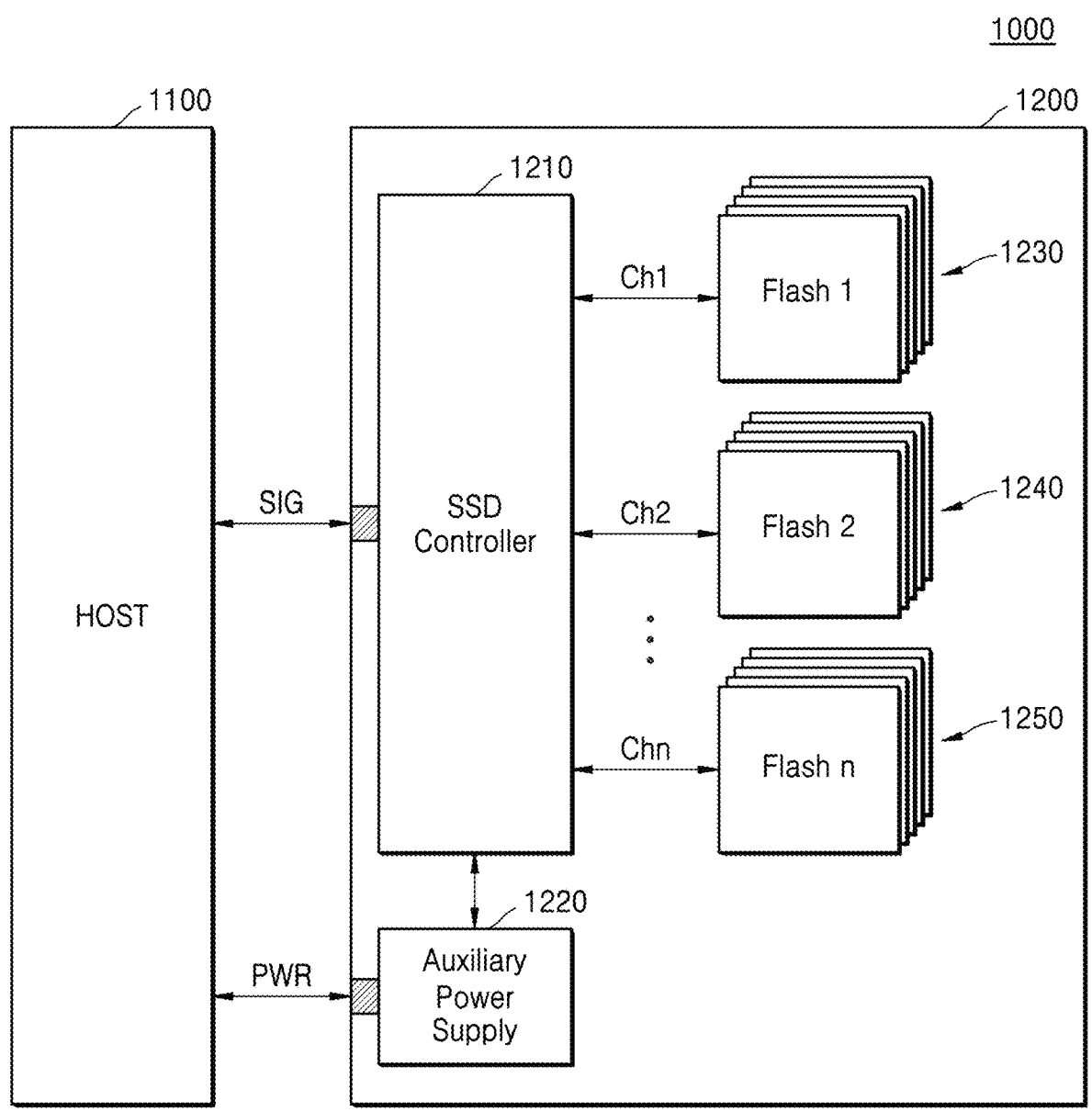
FIG. 13 is a block diagram illustrating a solid state drive (SSD) system according to an embodiment.

FIG. 13 is a block diagram illustrating a solid state drive (SSD) system 1000 according to an embodiment.

Referring to FIG. 13, the SSD system 1000 may include a host 1100 and an SSD 1200. The SSD 1200 may transfer and/or receive a signal to and/or from the host 1100 through a signal connector. Alternatively or additionally, the SSD 1200 may be supplied with power through a power connector. The SSD 1200 may include an SSD controller 1210, an auxiliary power supply 1220, and memory devices (e.g., first flash 1230, second flash 1240, and third flash 1250). The memory devices 1230, 1240, and 1250 may each be a NAND flash memory device of a vertical stack type. In some embodiments, the SSD 1200 may be implemented by using the embodiments described above with reference to FIGS. 1 to 12. As such, each of the memory devices 1230, 1240, and 1250 may perform an operation of cancelling a noise voltage as described above with reference to FIGS. 1 to 12.

Hereinabove, exemplary embodiments have been described in the drawings and the specification. Embodiments have been described by using the terms described herein, but this has been merely used for describing the present disclosure and has not been used for limiting a meaning or limiting the scope of the present disclosure defined in the following claims. Therefore, it may be understood by those of ordinary skill in the art that various modifications and other equivalent embodiments may be implemented from the present disclosure. Accordingly, the spirit and scope of the present disclosure may be defined based on the spirit and scope of the following claims.

While the present disclosure has been particularly shown and described with reference to embodiments thereof, it is to be understood that various changes in form and details may be made therein without departing from the spirit and scope of the following claims.

What is claimed is:
1. A memory device, comprising:
    a first pad;
    a memory cell plane comprising a plurality of memory cells;
    a page buffer circuit configured to:
        sense the memory cell plane; and
        identify, based on the sensing of the memory cell plane, a state stored in a memory cell of the plurality of memory cells, according to a ground voltage; and
    a noise cancellation circuit configured to:
        receive a first ground voltage from the first pad;
        determine a reference voltage based on the first ground voltage;
        generate a second ground voltage that offsets a noise voltage, based on the reference voltage; and
        output the second ground voltage to the page buffer circuit.
2. The memory device of claim 1, wherein:
    the memory cell plane comprises a plurality of memory cell planes,
    the page buffer circuit comprises a plurality of page buffer circuits corresponding to the plurality of memory cell planes, the noise cancellation circuit comprises a plurality of noise cancellation circuits corresponding to the plurality of memory cell planes, and each of the plurality of noise cancellation circuits is configured to output the second ground voltage to a corresponding page buffer circuit of the plurality of page buffer circuits.

3. The memory device of claim 1, wherein the noise cancellation circuit comprises:

a resistor comprising a first terminal coupled with a first node, and further comprising a second terminal to which the first ground voltage is applied;

a capacitor comprising a first terminal coupled with a second node, and further comprising a second terminal to which an external voltage is applied;

a switch coupled between the first node and the second node; and a comparator comprising a first input terminal coupled with the first node, a second input terminal coupled with the second node, and an output terminal through which the second ground voltage is output.

4. The memory device of claim 3, further comprising:

a control circuit configured to transfer, to the noise cancellation circuit, a signal indicating an operation of the noise cancellation circuit, wherein the switch is configured to:

in response to a first signal from the control circuit, turn on and couple the first node with the second node; and in response to a second signal from the control circuit, turn off and decouple the first node from the second node.

5. The memory device of claim 3, wherein the switch is configured to:

based on the switch being turned on, set a second voltage level of the second node to match a first voltage level of the first ground voltage that corresponds to the reference voltage, and based on the switch being turned off, set the second voltage level of the second node to match the reference voltage.

6. The memory device of claim 5, wherein the comparator is configured to:

generate, based on the switch being turned off, the second ground voltage, based on the first ground voltage and the reference voltage.

7. The memory device of claim 6, wherein:

the comparator comprises a differential comparator, and the noise cancellation circuit is further configured to:

perform an input transconductance calibration operation of the differential comparator; and generate the second ground voltage, based on the first ground voltage and the reference voltage.

8. A memory system, comprising:

a memory device comprising a first pad; and a memory controller configured to transfer, to the memory device, a command indicating an operation of the memory device, wherein the memory device further comprises:

a memory cell plane comprising a plurality of memory cells;

a page buffer circuit configured to:

sense the memory cell plane; and identify, based on the sensing of the memory cell plane, a state stored in a memory cell of the plurality of memory cells, according to a ground voltage; and a noise cancellation circuit configured to output a second ground voltage that offsets a noise voltage, based on a first ground voltage received from the first pad, and wherein the noise cancellation circuit is further configured to:

determine a reference voltage based on the first ground voltage;

generate the second ground voltage that offsets the noise voltage, based on the reference voltage; and output, to the page buffer circuit, the second ground voltage, in response to the command.

9. The memory system of claim 8, wherein:

the memory cell plane comprises a plurality of memory cell planes, the page buffer circuit comprises a plurality of page buffer circuits corresponding to the plurality of memory cell planes, the noise cancellation circuit comprises a plurality of noise cancellation circuits corresponding to the plurality of memory cell planes, and each of the plurality of noise cancellation circuits is configured to output the second ground voltage to a corresponding page buffer circuit of the plurality of page buffer circuits.

10. The memory system of claim 8, wherein the noise cancellation circuit comprises:

a resistor comprising a first terminal coupled with a first node, and further comprising a second terminal to which the first ground voltage is applied;

a capacitor comprising a first terminal coupled with a second node, and further comprising a second terminal to which an external voltage is applied;

a switch coupled between the first node and the second node; and a comparator comprising a first input terminal coupled with the first node, a second input terminal coupled with the second node, and an output terminal through which the second ground voltage is output.

11. The memory system of claim 10, wherein:

the memory device further comprises a control circuit configured to transfer, to the noise cancellation circuit, a signal indicating an operation of the noise cancellation circuit, and the switch is configured to:

in response to a first signal from the control circuit, turn on and couple the first node with the second node; and in response to a second signal from the control circuit, turn off and decouple the first node from the second node.

12. The memory system of claim 10, wherein the switch is configured to:

based on the switch being turned on, set a second voltage level of the second node to match a first voltage level of the first ground voltage that corresponds to the reference voltage, and based on the switch being turned off, set the second voltage level of the second node to match the reference voltage.

13. The memory system of claim 12, wherein the comparator is configured to:

generate, based on the switch being turned off, the second ground voltage, based on the first ground voltage and the reference voltage.

14. The memory system of claim 13, wherein:
the comparator comprises a differential comparator, and
the noise cancellation circuit is further configured to:
- perform an input transconductance calibration operation of the differential comparator; and
- generate the second ground voltage, based on the first ground voltage and the reference voltage.

15. An operating method of a memory device, the operating method comprising:
- determining a reference voltage based on a first ground voltage applied through a ground pad of the memory device;
- generating a second ground voltage that offsets a noise voltage, based on the reference voltage; and
- outputting the second ground voltage to a page buffer circuit of the memory device sensing a memory cell plane of the memory device.

16. The operating method of claim 15, wherein the determining of the reference voltage comprises determining the reference voltage during a first time period in response to a first signal from a control circuit of the memory device.

17. The operating method of claim 16, wherein the generating of the second ground voltage comprises generating the second ground voltage during a second time period in response to a second signal from the control circuit of the memory device.

18. The operating method of claim 17, wherein the determining of the reference voltage comprises determining, as the reference voltage, a voltage level corresponding to the first ground voltage during the first time period.

19. The operating method of claim 18, wherein the generating of the second ground voltage comprises generating the second ground voltage, based on the first ground voltage during the second time period and the reference voltage.

20. The operating method of claim 19, wherein the generating of the second ground voltage comprises:
- performing an input transconductance calibration operation of a differential comparator; and
- generating the second ground voltage, based on the first ground voltage during the second time period and the reference voltage.

* * * * *